US010162546B2

(12) United States Patent
Iwasaki

(10) Patent No.: US 10,162,546 B2
(45) Date of Patent: Dec. 25, 2018

(54) IMAGING APPARATUS AND METHOD OF CONTROLLING THE APPARATUS

(71) Applicant: CANON KABUSHIKI KAISHA, Tokyo (JP)

(72) Inventor: Takahiro Iwasaki, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/126,547

(22) PCT Filed: Feb. 24, 2015

(86) PCT No.: PCT/JP2015/000920
§ 371 (c)(1),
(2) Date: Sep. 15, 2016

(87) PCT Pub. No.: WO2015/141141
PCT Pub. Date: Sep. 24, 2015

(65) Prior Publication Data
US 2017/0090810 A1    Mar. 30, 2017

(30) Foreign Application Priority Data
Mar. 17, 2014   (JP) ................. 2014-054184

(51) Int. Cl.
*G06F 3/06*     (2006.01)
*H04N 5/232*    (2006.01)
(Continued)

(52) U.S. Cl.
CPC .......... *G06F 3/0631* (2013.01); *G06F 3/0604* (2013.01); *G06F 3/067* (2013.01);
(Continued)

(58) Field of Classification Search
CPC .......... H04N 5/23206; H04N 5/23293; H04N 17/183; H04N 1/00204; H04N 1/00944;
(Continued)

(56) References Cited

U.S. PATENT DOCUMENTS 7,098,948 B2 * 8/2006 Ikehata ................ G11B 27/034
                                                    348/231.8
7,680,276 B2 * 3/2010 Steinberg ................ G06F 21/85
                                                    348/207.1
(Continued)

FOREIGN PATENT DOCUMENTS

CN    1605471 A    4/2005
CN    1787611 A    6/2006
(Continued)

*Primary Examiner* — Pritham Prabhakher
(74) *Attorney, Agent, or Firm* — Canon U.S.A., Inc. IP Division

(57) ABSTRACT

The present invention relates to an imaging apparatus capable of mounting multiple storages and transmitting and receiving data to and from the multiple storages. The imaging apparatus includes a first interface configured to receive detailed information necessary for the mounting and an instruction to mount a specific storage from the outside and a second interface configured to receive an instruction to mount an arbitrary storage with at least part of the detailed information necessary for the mounting being omitted from the outside.

8 Claims, 16 Drawing Sheets

(51) Int. Cl.
  *H04N 5/77* (2006.01)
  *H04N 5/907* (2006.01)
  *H04N 9/804* (2006.01)
  *H04L 29/08* (2006.01)

(52) U.S. Cl.
  CPC ........ *G06F 3/0643* (2013.01); *H04L 67/1097* (2013.01); *H04N 5/23206* (2013.01); *H04N 5/77* (2013.01); *H04N 5/772* (2013.01); *H04N 5/907* (2013.01); *H04N 9/8042* (2013.01)

(58) Field of Classification Search
  CPC ........... H04N 1/00946; H04N 1/00095; H04N 1/00973; H04N 1/2166; H04N 1/32358; H04N 1/32101; H04N 1/00209; H04N 1/00244; H04N 2201/0039; H04N 2201/0043; H04N 2201/0046; H04N 2201/0094; H04L 67/1097; G06F 11/00; G06F 13/10; G06F 3/1293; G06F 3/1296; G06F 3/0605; G06F 3/0635; G06F 3/0683; G11B 27/002; G11B 2220/41
  USPC ....................................... 348/231.8
  See application file for complete search history.

(56) References Cited

U.S. PATENT DOCUMENTS

| | | | | |
|---|---|---|---|---|
| 8,051,113 B1* | 11/2011 | Shekar | .............. | G06F 17/30067 707/821 |
| 8,120,674 B2* | 2/2012 | Koike | ................. | H04N 1/2112 348/231.2 |
| 8,531,552 B2* | 9/2013 | Senda | ............... | H04N 1/00127 348/231.1 |
| 8,990,408 B1* | 3/2015 | Owen | .................. | H04L 67/303 709/227 |
| 9,244,969 B1* | 1/2016 | Love | .................. | G06F 17/30386 |
| 9,336,233 B2* | 5/2016 | Chatley | ................. | G06F 3/0613 |
| 9,497,257 B1* | 11/2016 | Love | ....................... | H04L 67/06 |
| 2006/0136707 A1* | 6/2006 | Fukasawa | .......... | H04N 1/00204 713/2 |
| 2008/0222158 A1* | 9/2008 | Saika | ................. | G06F 17/30197 |
| 2009/0082889 A1 | 3/2009 | Takashima et al. | | |
| 2010/0091114 A1* | 4/2010 | Ito | ...................... | H04N 1/00127 348/207.1 |
| 2010/0321728 A1* | 12/2010 | Shibao | ............... | H04N 1/00204 358/1.15 |
| 2011/0019216 A1* | 1/2011 | Kataoka | ............. | H04N 1/00222 358/1.13 |
| 2012/0158806 A1* | 6/2012 | Snyder | ................ | H04L 67/1097 707/827 |
| 2014/0071477 A1* | 3/2014 | Akazawa | ........... | H04N 1/00891 358/1.14 |
| 2015/0146019 A1* | 5/2015 | Aoyama | ............ | H04N 1/00129 348/207.1 |
| 2015/0234719 A1* | 8/2015 | Coronado | ............. | G06F 11/203 714/6.3 |
| 2015/0281354 A1* | 10/2015 | Jin | ...................... | H04L 67/1097 709/213 |

FOREIGN PATENT DOCUMENTS

| | | |
|---|---|---|
| JP | 2003241903 A | 8/2003 |
| JP | 2005063421 A | 3/2005 |
| JP | 2008262627 A | 10/2008 |
| JP | 2009081730 A | 4/2009 |
| JP | 2009176200 A | 8/2009 |
| WO | 2013175979 A1 | 11/2013 |

* cited by examiner

[Fig. 1]
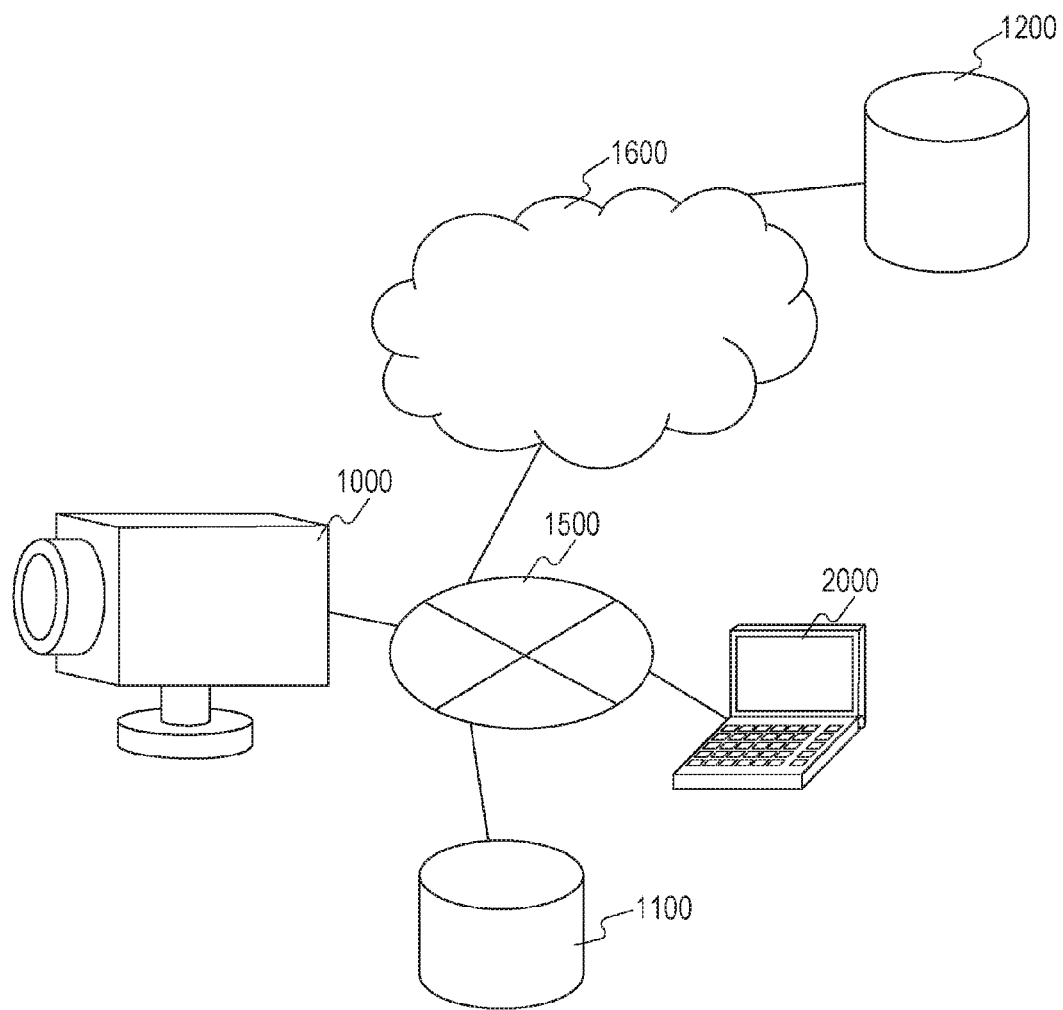
[Fig. 2A]
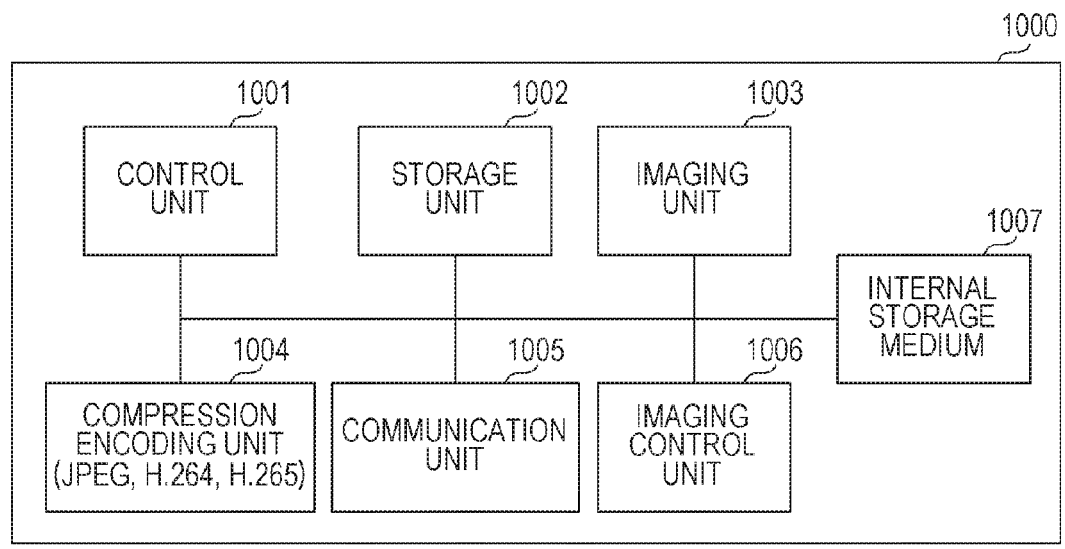

[Fig. 2B]
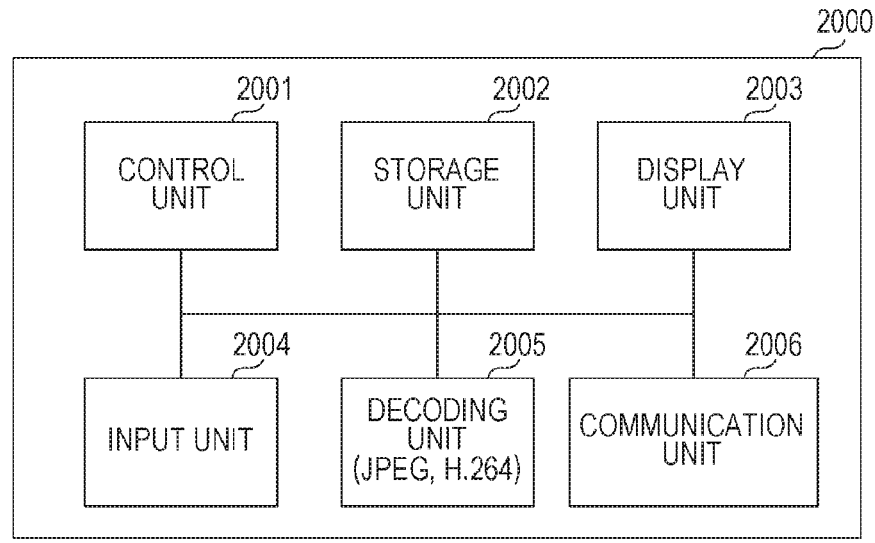
[Fig. 3]
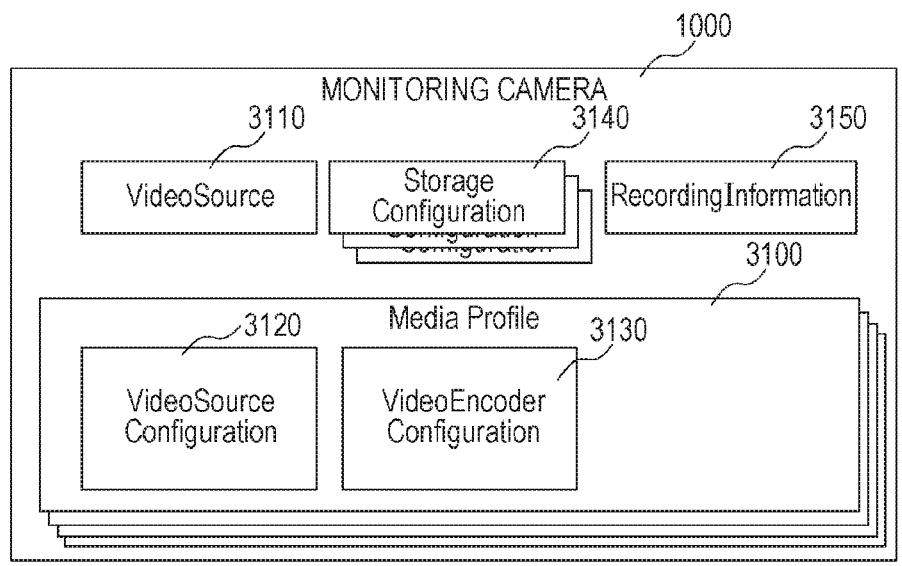
[Fig. 4A]
```
<xs:complexType name="StorageConfiguration">
  <xs:complexContent>
    <xs:extension base="tt:DeviceEntity">
      <xs:sequence>
        <xs:element name="Data" type="tt:StorageConfigurationData"/>
      </xs:sequence>
      <xs:anyAttribute processContents="lax"/>
    </xs:extension>
  </xs:complexContent>
</xs:complexType>
```

[Fig. 4B]

```
<xs:complexType name="StorageConfigurationData">
  <xs:sequence>
    <xs:element name="LocalPath" type="tt:anyURI" minOccurs="0"/>
    <xs:element name="StorageUri" type="xs:anyURI" minOccurs="0"/>
    <xs:element name="User" type="tt:UserCredentials" minOccurs="0"/>
    <xs:element name="Extension" type="StorageConfigurationExtension" minOccurs="0"/>
  </xs:sequence>
  <xs:attribute name="type" type="xs:string" use="required"/>
  <xs:anyAttribute processContents="lax"/>
</xs:complexType>
```

[Fig. 4C]

```
<xs:complexType name="UserCredentials">
  <xs:sequence>
    <xs:element name="Username" type="xs:string"/>
    <xs:element name="Password" type="xs:string" minOccurs="0"/>
    <xs:element name="Extension" type="tt:UserCredentialsExtension" minOccurs="0"/>
  </xs:sequence>
  <xs:anyAttribute processContents="lax"/>
</xs:complexType>
```

[Fig. 4D]

```
<xs:simpleType name="StorageType">
  <xs:restriction base="xs:string">
    <xs:enumeration value="NFS"/>
    <xs:enumeration value="SMB"/>
    <xs:enumeration value="CIFS"/>
    <xs:enumeration value="CDMI"/>
    <xs:enumeration value="SDCARD"/>
    <xs:enumeration value="AUTO"/>
    <xs:enumeration value="Extended"/>
  </xs:restriction>
</xs:simpleType>
```

[Fig. 4E]

```
<xs:complexType name="StorageConfigurationOption">
  <xs:sequence>
    <xs:element name="type" type="tt: StorageType " minOccurs="0"/>
  </xs:sequence>
  <xs:anyAttribute processContents="lax"/>
</xs:complexType>
```

[Fig. 5]

```
(1) GetStorageConfigurations command
<s:Envelope xmlns:s="http://www.w3.org/2003/05/soap-envelope"
xmlns:a="http://www.w3.org/2005/08/addressing">
  <s:Body xmlns:xsi="http://www.w3.org/2001/XMLSchema-instance"
xmlns:xsd="http://www.w3.org/2001/XMLSchema">
    <GetStorageConfigurations xmlns="http://www.onvif.org/ver10/device/wsdl"/>
  </s:Body>
</s:Envelope>

(2) GetStorageConfigurations response
<s:Envelope xmlns:s="http://www.w3.org/2003/05/soap-envelope"
xmlns:tt="http://www.onvif.org/ver10/schema" xmlns:dm="http://www.onvif.org/ver10/device/wsdl">
  <s:Body>
    <dm:GetStorageConfigurationsResponse>
      <tt:StorageConfiguration token="storage1" type="AUTO">         ~5000
        <tt:Date/>
      </tt:StorageConfiguration>
      <tt:StorageConfiguration token="storage2" type="CIFS">          ~5001
        <tt:Data>
          <tt:LocalPath>/mnt/cifs1</tt:LocalPath>
          <tt:StorageUri>//cifs_server/disk1/share/</tt:StorageUri>
          <tt:User>
            <tt:Username>cifs_user</tt:Username>
            <tt:Password>user_pass1</tt:Password>
          </tt:User>
        </tt:Data>
      </tt:StorageConfiguration>
      <tt:StorageConfiguration token="storage3" type="CDMI">          ~5002
        <tt:Data>
          <tt:LocalPath>/mnt/cdmi1</tt:LocalPath>
          <tt:StorageUri>//cdmi:1024/service/export/</tt:StorageUri>
          <tt:User>
            <tt:Username>cdmi_user</tt:Username>
            <tt:Password>user_pass</tt:Password>
          </tt:User>
        </tt:Data>
      </tt:StorageConfiguration>
      <tt:StorageConfiguration token="storage4" type="SDCARD">        ~5003
        <tt:Data>
          <tt:LocalPath>/mnd/sd</tt:LocalPath>
          <tt:StorageUri>/dev/sdcard/1</tt:StorageUri>
        </tt:Data>
      </tt:StorageConfiguration>
    </dm:GetStorageConfigurationsResponse>
  </s:Body>
</s:Envelope>
```

[Fig. 6]

```
(1) GetStorageConfigurationOptions command
<s:Envelope xmlns:s="http://www.w3.org/2003/05/soap-envelope"
xmlns:a="http://www.w3.org/2005/08/addressing">
  <s:Body xmlns:xsi="http://www.w3.org/2001/XMLSchema-instance"
xmlns:xsd="http://www.w3.org/2001/XMLSchema">
    <GetStorageConfigurationOptions xmlns="http://www.onvif.org/ver10/device/wsdl"/>
  </s:Body>
</s:Envelope>

(2) GetStorageConfigurationOptions response
<s:Envelope xmlns:s="http://www.w3.org/2003/05/soap-envelope"
xmlns:tt="http://www.onvif.org/ver10/schema" xmlns:dm="http://www.onvif.org/ver10/device/wsdl">
  <s:Body>
    <dm:GetStorageConfigurationOptionsResponse>
      <tt:StorageConfigurationOptions>
        <tt:type>CIFS</tt:type>
        <tt:type>CDMI</tt:type>
        <tt:type>SDCARD</tt:type>
        <tt:type>AUTO</tt:type>
      </tt:StorageConfigurationOptions>
    </dm:GetStorageConfigurationOptionsResponse>
  </s:Body>
</s:Envelope>
```

[Fig. 7]

```
(1) SetStorageConfiguration command
<s:Envelope xmlns:s="http://www.w3.org/2003/05/soap-envelope"
xmlns:a="http://www.w3.org/2005/08/addressing">
  <s:Body xmlns:xsi="http://www.w3.org/2001/XMLSchema-instance"
xmlns:xsd="http://www.w3.org/2001/XMLSchema">
    <SetStorageConfiguration xmlns="http://www.onvif.org/ver10/device/wsdl">
      <tt:StorageConfiguration token="storage1" type="AUTO">
        <tt:Data/>
      </tt:StorageConfiguration>
    </SetStorageConfiguration>
  </s:Body>
</s:Envelope>

(2) SetStorageConfiguration response
<s:Envelope xmlns:s="http://www.w3.org/2003/05/soap-envelope"
xmlns:tt="http://www.onvif.org/ver10/schema" xmlns:dm="http://www.onvif.org/ver10/device/wsdl">
  <s:Body>
    <dm:SetStorageConfigurationResponse/>
  </s:Body>
</s:Envelope>
```

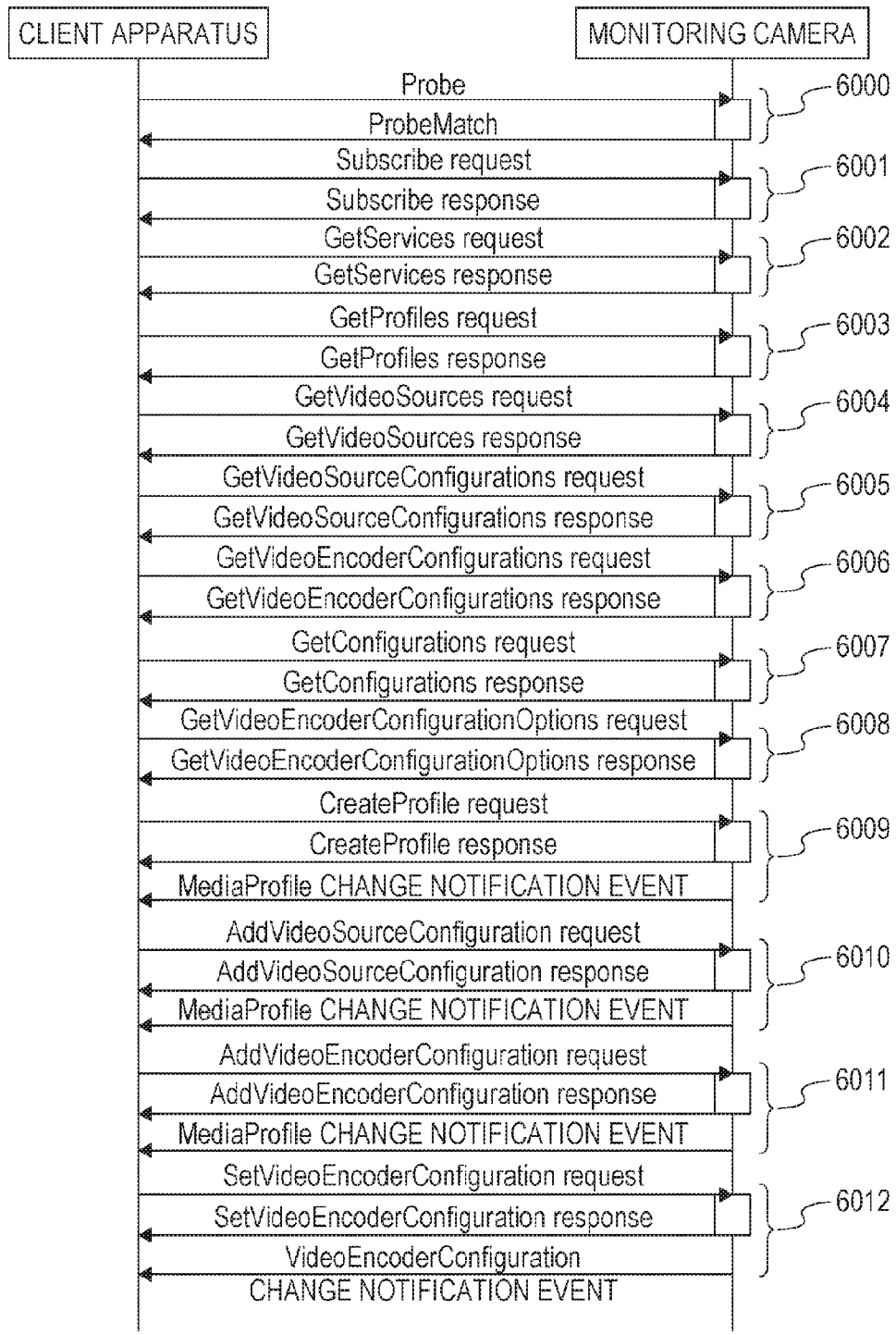
[Fig. 8]

[Fig. 9]
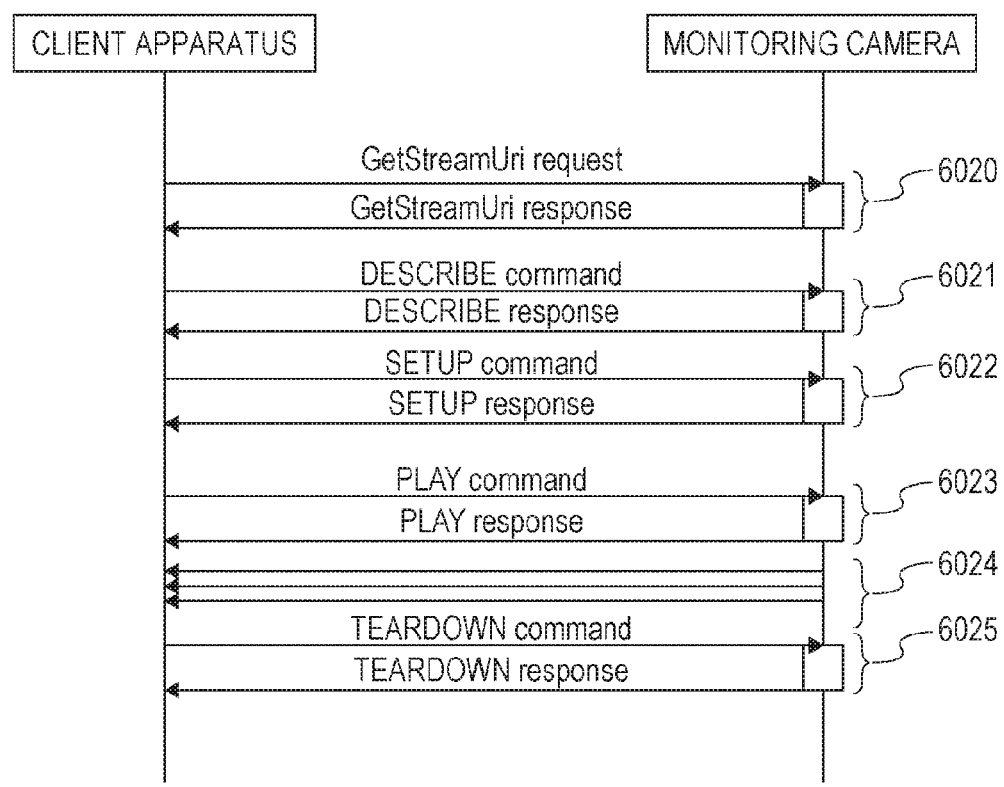

[Fig. 10]
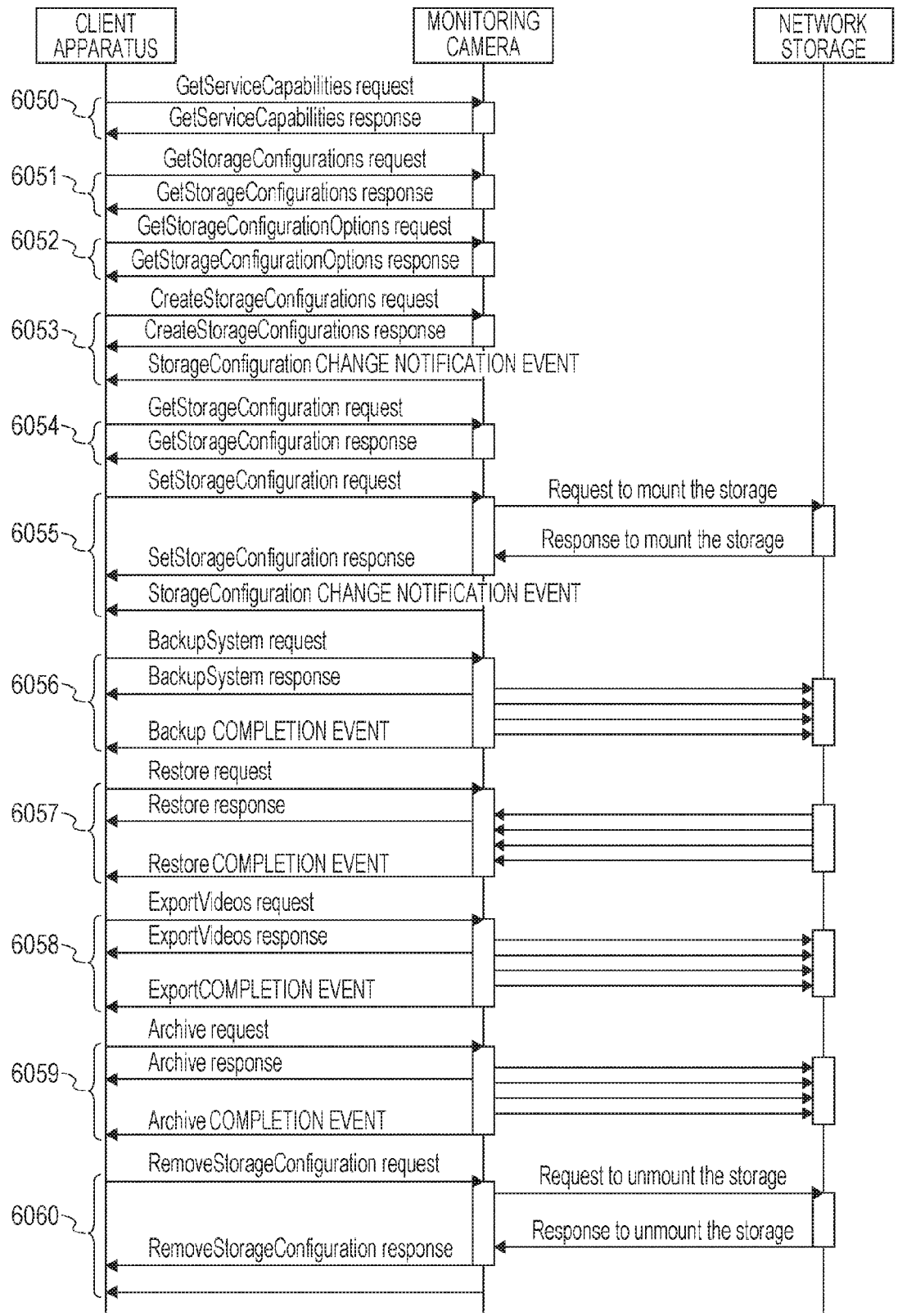

[Fig. 11]
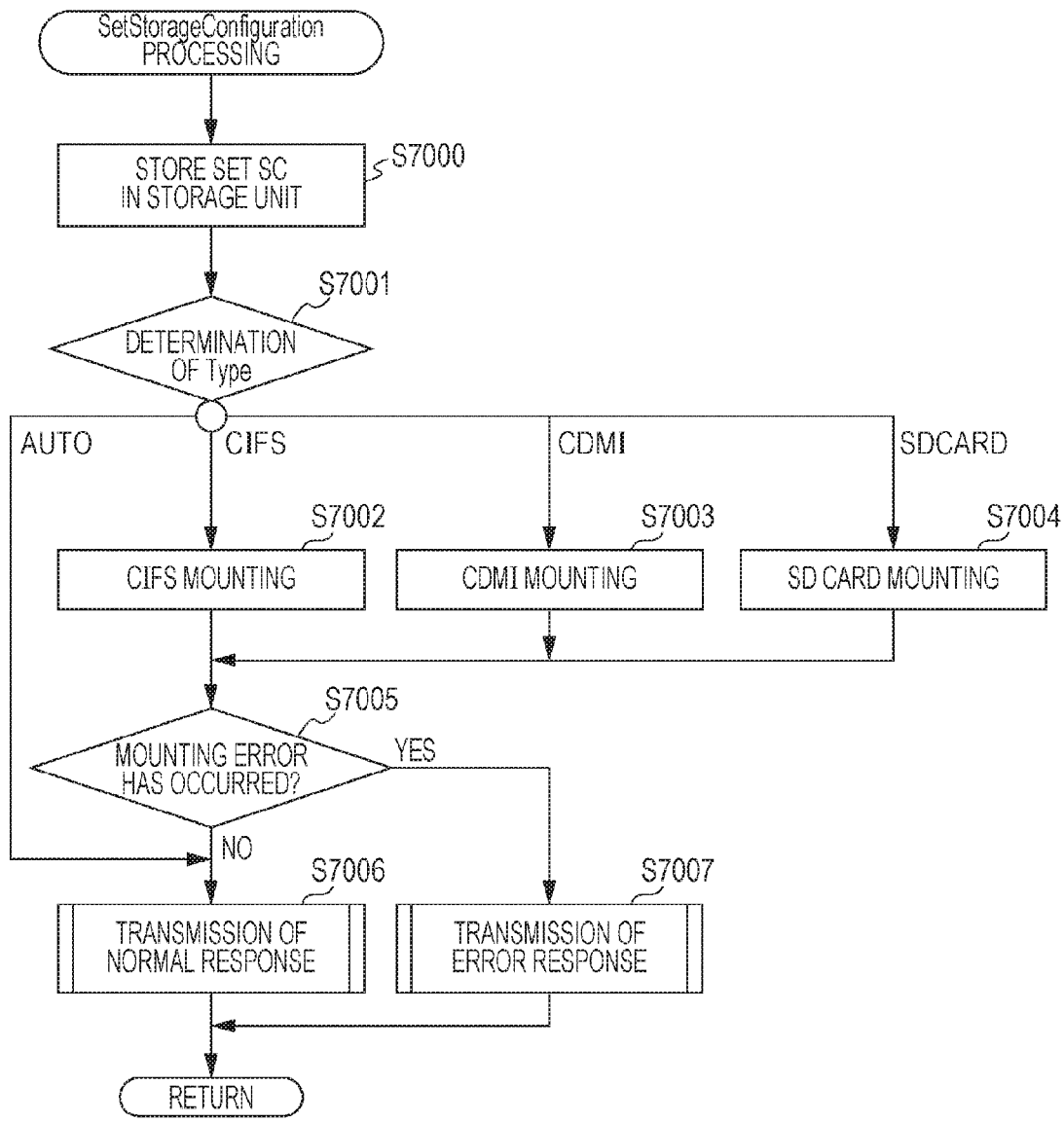

[Fig. 12]
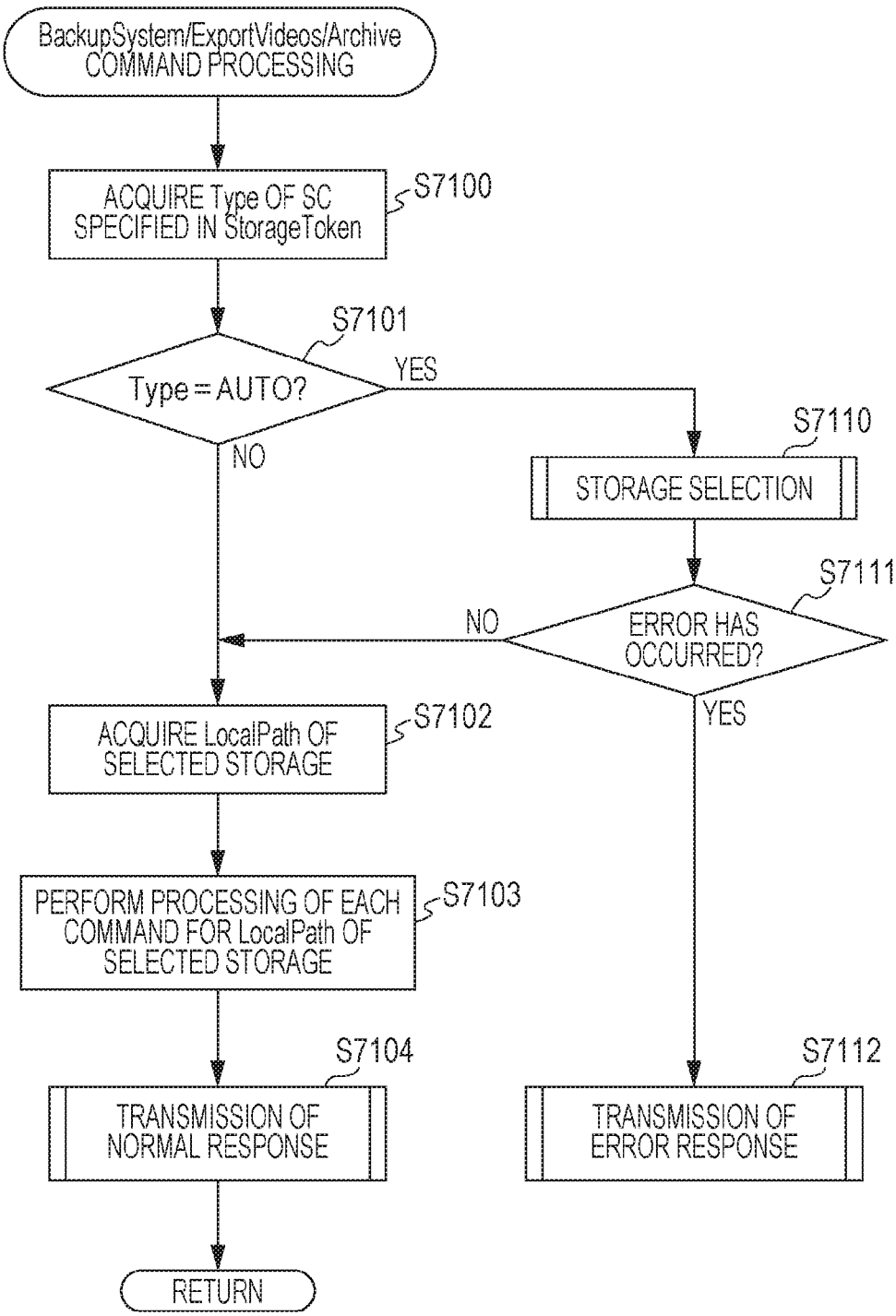

[Fig. 13]
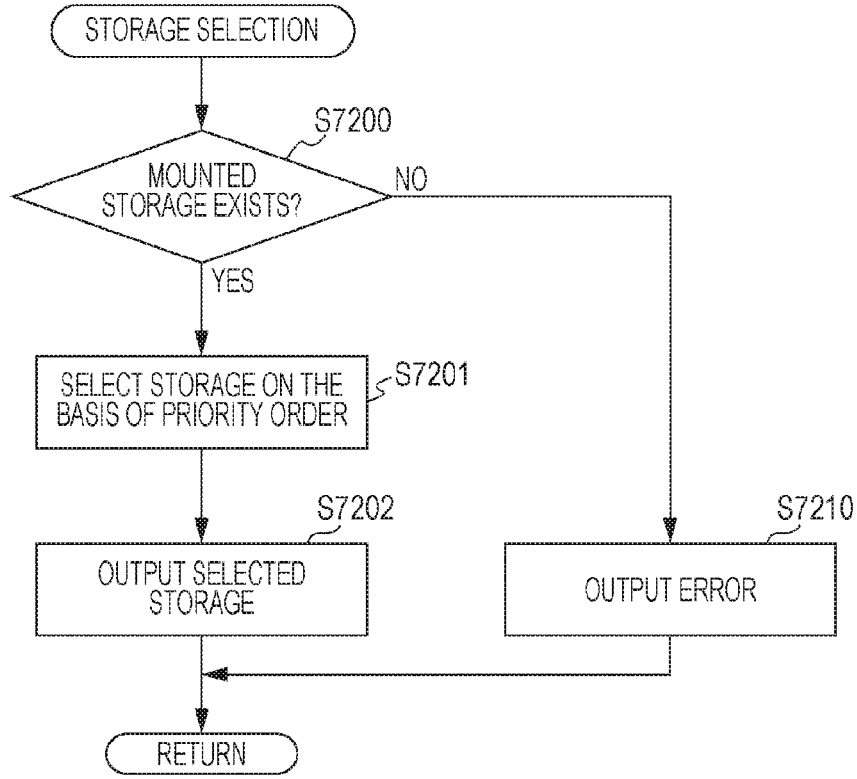
[Fig. 14A]
| PRIORITY ORDER | 1 | 2 | 3 |
|---|---|---|---|
| BackupSystem COMMAND | SDCARD | CDMI | CIFS |
| ExportVideos COMMAND | CIFS | CDMI | SDCARD |
| Archive COMMAND | CIFS | SDCARD | CDMI |
[Fig. 14B]
| PRIORITY ORDER | 1 | 2 | 3 |
|---|---|---|---|
| BackupSystem COMMAND | Storage1 | Storage2 | Storage3 |
| ExportVideos COMMAND | Storage2 | Storage3 | Storage1 |
| Archive COMMAND | Storage2 | Storage3 | Storage1 |

[Fig. 15]

Storage Operation screen

Operation: BackupSystem ▽ ~8000
- Restore
- ExportVideos
- Archive
- Mount
- Unmount Operation Target ID: New ▽ ~8001
- Storage2
- Storage3
- Recording1

Storage type ~8002
- ● CIFS  ○ CDMI  ○ SD card  ○ AUTO

Local Path ~8003
Storage Uri ~8004
Username ~8005
Password ~8006
Target Data ~8007

Invoke (8008)   Cancel (8009)

[Fig. 16]
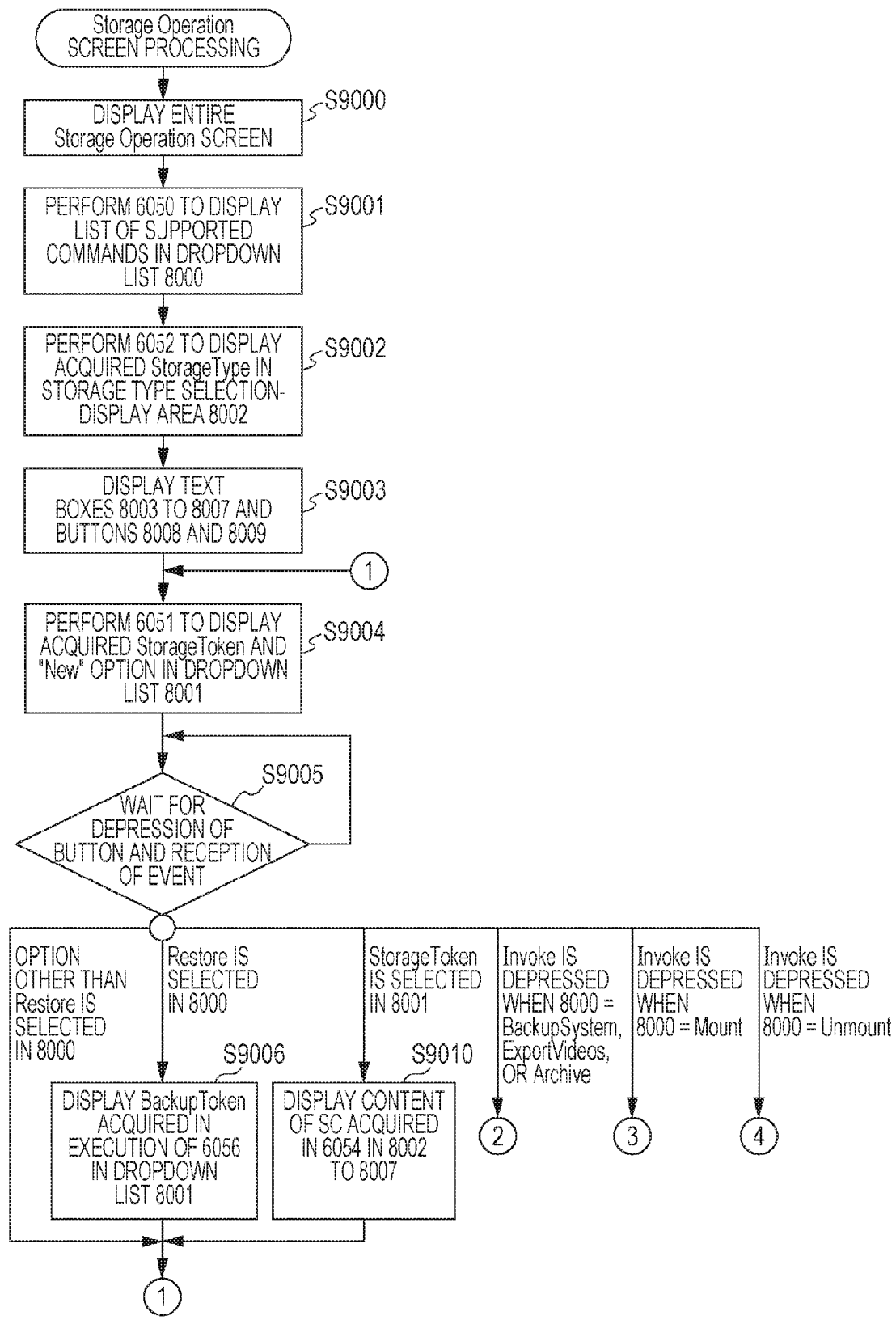

[Fig. 17]
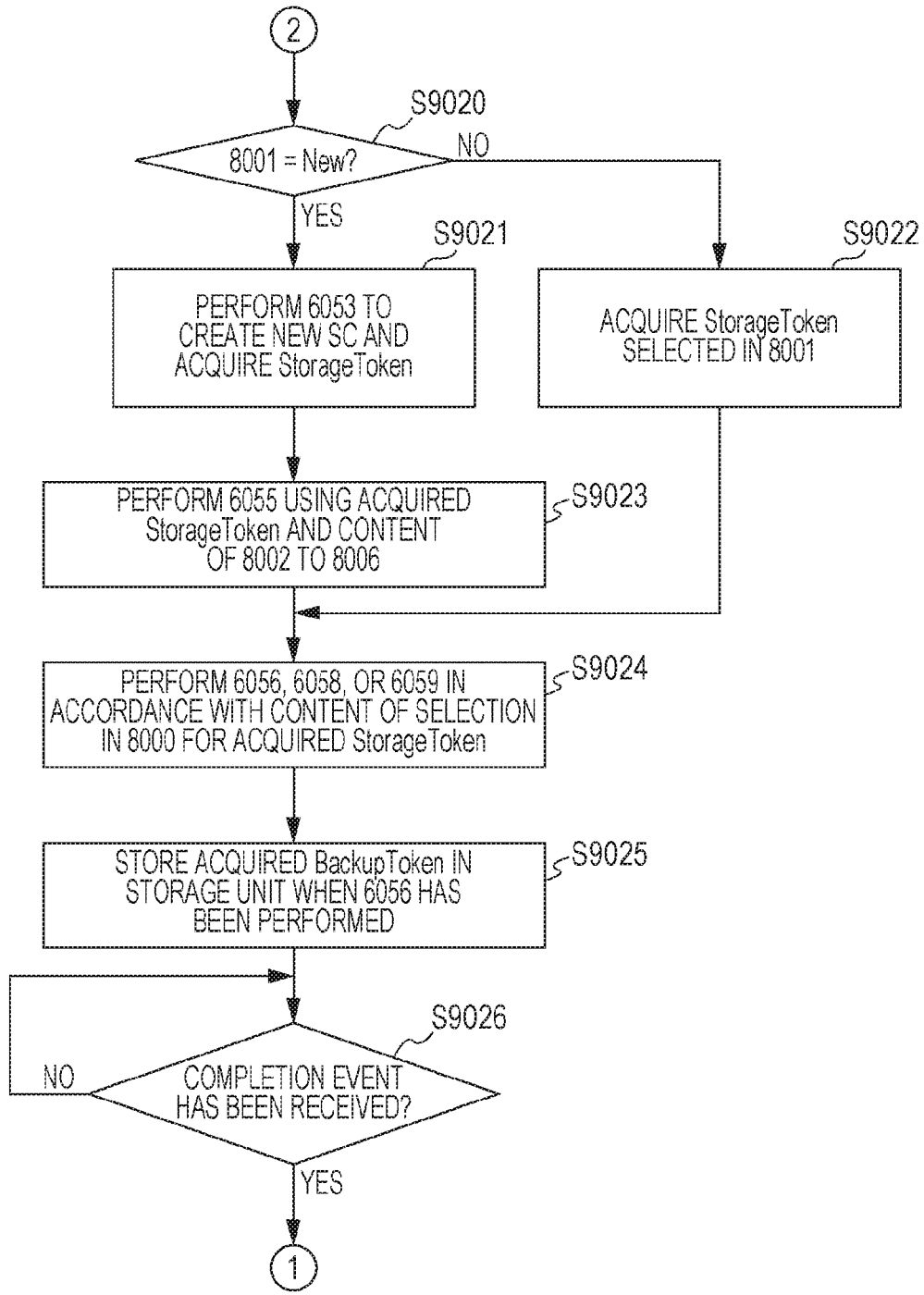

[Fig. 18]
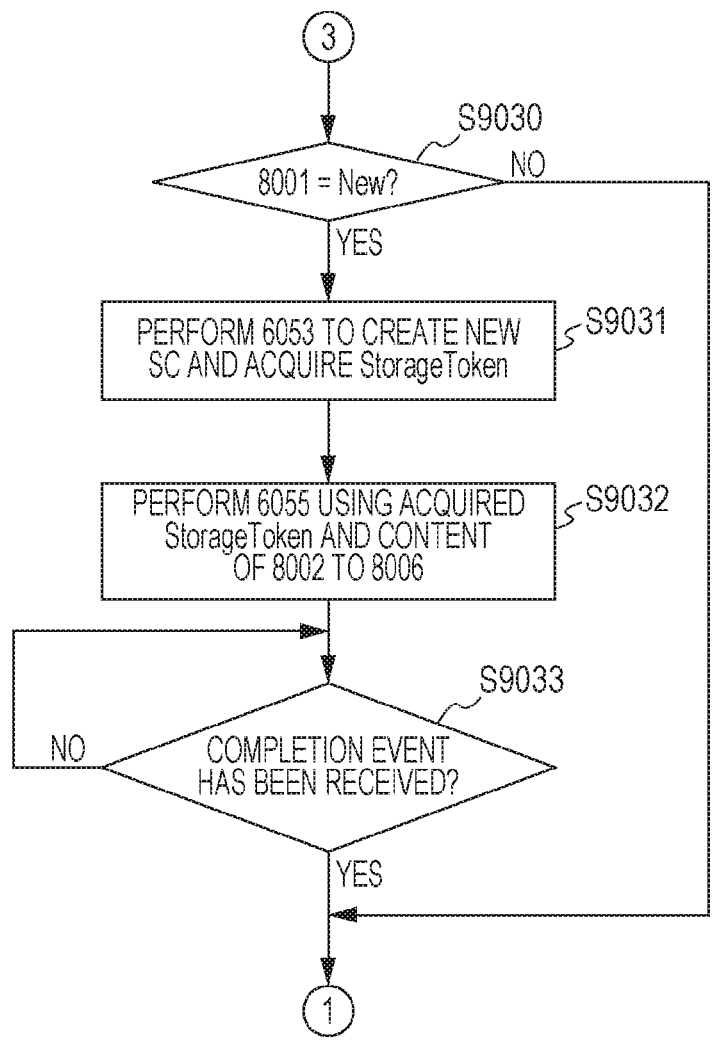

[Fig. 19]
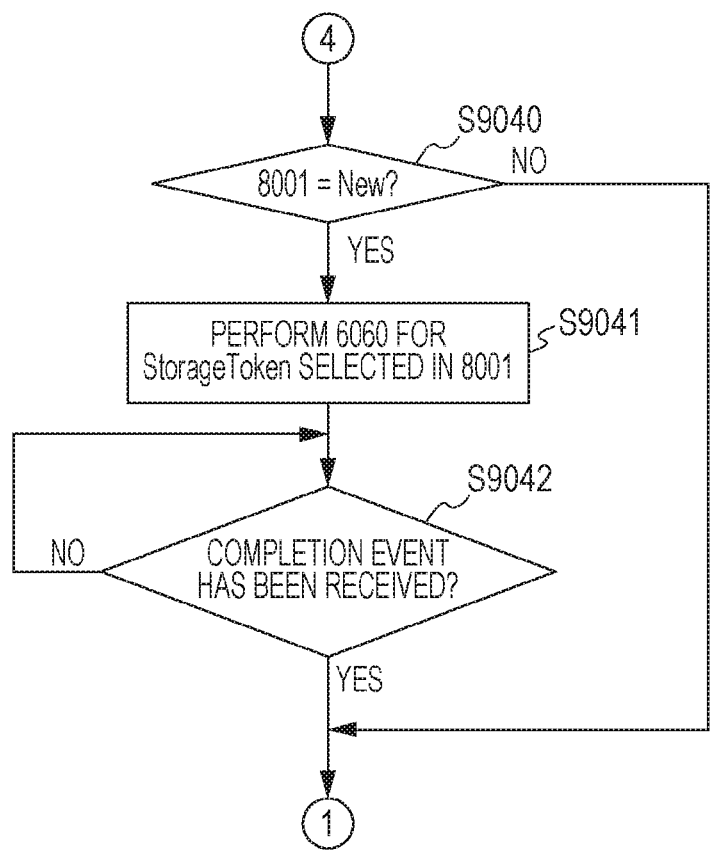

IMAGING APPARATUS AND METHOD OF CONTROLLING THE APPARATUS

TECHNICAL FIELD

The present invention relates to an imaging apparatus capable of saving data in an external storage and a method of controlling the imaging apparatus.

BACKGROUND ART

Network storage systems have been practical use in recent years in which high-capacity and highly functional storages are built on Internet protocol (IP) networks. The network storage systems are made available by mounting host devices. Various protocols to access network storages are used to support the network storage systems. For example, the protocols include Network File System (NFS), Server Message Block (SMB), Common Internet File System (CIFS), and Cloud Data Management Interface (CDMI). Ideas to access the various storages using the same protocol have been disclosed (for example, refer to PTL 1).

In addition, in imaging apparatuses that transmit captured ages to client devices, command groups from the client devices to instruct change of settings of the imaging apparatuses and start of delivery of images have hitherto been installed. A command group defined by a standard developed by Open Network Video Interface Forum (ONVIF) is known as an example of the command groups in recent years.

Such a command group includes a command from the client device to cause the imaging apparatus to mount a storage. The command group also includes a command from client device to cause data in the imaging apparatus to be output to the mounted storage. A SetStorageConfiguration command is defined as the former command. An ExportVideos command is defined as the latter command. The mounting means that the storage or the like is put into a writable or readable state.

Heretofore, it is necessary for users of the client devices to get a lot of information in advance and input the information in the mounting in order to cause the host devices to mount external network storages from the client devices using the command groups described above. For example, it is necessary for the users of the client devices to input information about protocols with which the host devices are capable of performing the mounting, local paths along which the host devices are to perform the mounting, network storages accessible from the host devices, etc. and, thus, the mounting of the external network storages is disadvantageously complicated. In addition, persons other than managers of the host devices may not be capable of getting such information. Accordingly, there is a problem in that it may be difficult for general users who want to save the data from the host devices to the external storages using the above command groups to make the settings.

CITATION LIST

Patent Literature

PTL 1: Japanese Patent Laid-Open No. 2003-241903

SUMMARY OF INVENTION

The present invention provides an imaging apparatus capable of transmitting and receiving data to and from multiple storages mounted on a network. The imaging apparatus includes a first interface configured to receive detailed information necessary for mounting the storages and an instruction to mount a specific storage and a second interface configured to receive an instruction to mount an arbitrary storage with at least part of the detailed information necessary for mounting the storages being omitted.

Further features of the present invention will become apparent from the following description of exemplary embodiments with reference to the attached drawings.

BRIEF DESCRIPTION OF DRAWINGS

FIG. 1 illustrates an exemplary configuration of an imaging system including a monitoring camera, which is an imaging apparatus, and a client apparatus in first and second embodiments of the present invention.

FIG. 2A is a block diagram illustrating an exemplary internal configuration of the monitoring camera in the imaging system in the first and second embodiments of the present invention.

FIG. 2B is a block diagram illustrating an exemplary internal configuration of the client apparatus in the imaging system in the first and second embodiments of the present invention.

FIG. 3 illustrates an exemplary structure of parameters held by the monitoring camera in the first and second embodiments of the present invention.

FIG. 4A illustrates command arguments and parameters transmitted and received between the monitoring camera and the client apparatus in detail in the first and second embodiments of the present invention.

FIG. 4B illustrates command arguments and parameters transmitted and received between the monitoring camera and the client apparatus in detail in the first and second embodiments of the present invention.

FIG. 4C illustrates command arguments and parameters transmitted and received between the monitoring camera and the client apparatus in detail in the first and second embodiments of the present invention.

FIG. 4D illustrates command arguments and parameters transmitted and received between the monitoring camera and the client apparatus in detail in the first and second embodiments of the present invention.

FIG. 4E illustrates command arguments and parameters transmitted and received between the monitoring camera and the client apparatus in detail in the first and second embodiments of the present invention.

FIG. 5 illustrates a command concerning the embodiments of the present invention and a response to the commands in detail.

FIG. 6 illustrates a command concerning the embodiments of the present invention and a response to the commands in detail.

FIG. 7 illustrates a command concerning the embodiments of the present invention and a response to the commands in detail.

FIG. 8 illustrates a typical exemplary command sequence between the monitoring camera and the client apparatus in the first and second embodiments of the present invention.

FIG. 9 illustrates a typical exemplary command sequence between the monitoring camera and the client apparatus in the first and second embodiments of the present invention.

FIG. 10 illustrates a typical exemplary command sequence between the monitoring camera and the client apparatus in the first and second embodiments of the present invention.

FIG. 11 is a flowchart illustrating an exemplary process of the monitoring camera when the SetSC command has been received in the first and second embodiments of the present invention.

FIG. 12 is a flowchart illustrating an exemplary process in the monitoring camera when the BackupSystem command, the ExportVideos command, or the Archive command has been received in the first and second embodiments of the present invention.

FIG. 13 is a flowchart illustrating an exemplary behavior of a control unit in the monitoring camera in a storage selection step in the first and second embodiments of the present invention.

FIG. 14A is a table illustrating exemplary information concerning an access mode type priority order held by the monitoring camera in the first and second embodiments of the present invention.

FIG. 14B is a table illustrating exemplary information concerning the access mode type priority order held by the monitoring camera in the first and second embodiments of the present invention.

FIG. 15 illustrates an exemplary Storage Operation screen of the client apparatus in the first and second embodiments of the present invention.

FIG. 16 is a flowchart illustrating an exemplary behavior of the client apparatus concerning the Storage Operation screen in the first and second embodiments of the present invention.

FIG. 17 is a flowchart illustrating the exemplary behavior of the client apparatus concerning the Storage Operation screen in the first and second embodiments of the present invention.

FIG. 18 is a flowchart illustrating the exemplary behavior of the client apparatus concerning the Storage Operation screen in the first and second embodiments of the present invention.

FIG. 19 is a flowchart illustrating the exemplary behavior of the client apparatus concerning the Storage Operation screen in the first and second embodiments of the present invention.

DESCRIPTION OF EMBODIMENTS

Embodiments of the present invention will herein be described with reference to the attached drawings.

First Embodiment

FIG. 1 illustrates an exemplary configuration of an imaging system including a monitoring camera 1000, which is an imaging apparatus, and a client apparatus 2000 in a first embodiment of the present invention. The client apparatus 2000 indicates an external device in the embodiments of the present invention. The monitoring camera 1000 and the client apparatus 2000 are connected to each other via an Internet protocol (IP) network 1500 so as to be capable of communicating with each other.

Referring to FIG. 1, the imaging system includes a network attached storage 1100 connected to the IP network 1500. The network attached storage 1100 is hereinafter abbreviated to the NAS 1100. The NAS 1100 includes an interface, such as CIFS, NFS, or SMB. The NAS 1100 is connected in a state in which the monitoring camera 1000 is accessible to the NAS 1100 that is mounted.

The imaging system also includes a cloud storage 1200 available via the Internet 1600, that is, a cloud. The cloud storage 1200 includes, for example, CDMI. The cloud storage 1200 is connected in a state in which the monitoring camera 1000 is accessible to the cloud storage 1200 that is mounted.

The client apparatus 2000 transmits various commands, such as a command to change imaging parameters described below and a command to start video streaming, to the monitoring camera 1000. The monitoring camera 1000 transmits responses to the commands and a video stream to the client apparatus 2000.

FIG. 2A is a block diagram illustrating an exemplary internal configuration of the monitoring camera 1000.

Referring to FIG. 2A, the monitoring camera 1000 includes a control unit 1001, a storage unit 1002, an imaging unit 1003, a compression encoding unit 1004, a communication unit 1005, an imaging control unit 1006, and an internal storage medium 1007. The control unit 1001 controls the entire monitoring camera 1000. The control unit 1001 is composed of, for example, a central processing unit (CPU).

The storage unit 1002 is mainly used as storage areas of a variety of data. For example, the storage unit 1002 is used as a storage area of programs executed by the control unit 1001, a working area during the execution of the programs, and a storage area of image data generated by the imaging unit 1003.

The imaging unit 1003 converts an analog signal acquired by capturing an image of an object by an imaging optical system of the monitoring camera 1000 into digital data and supplies the digital data to the storage unit 1002 as a captured image. When the captured image is supplied to the storage unit 1002, the control unit 1001 receives an image acquisition event from the imaging unit 1003.

The compression encoding unit 1004 performs compression and encoding to the captured image output from the imaging unit 1003 in, for example, a Joint Photographic Experts Group (JPEG) format or an H.264 format to generate image data and supplies the image data to the storage unit 1002.

The communication unit 1005 is used when the monitoring camera 1000 receives each control command from the external device and when the monitoring camera 1000 transmits a response to each control command to the external device. Upon reception of a command from the external device, the control unit 1001 receives a command reception event from the communication unit 1005.

The imaging control unit 1006 is used to change an imaging range of the imaging unit 1003 to tilt drive, pan drive, or zoom drive in accordance with the value of tilting, panning, or zooming, respectively, which is supplied from the control unit 1001.

The internal storage medium 1007 is a storage capable of being used by the control unit 1001 to, for example, save data. The internal storage medium 1007 is composed of a file system built on, for example, a Secure Digital (SD) memory card, a universal serial bus (USB) drive, or a hard disk drive.

FIG. 2B is a block diagram illustrating an exemplary internal configuration of the client apparatus 2000.

Referring to FIG. 2B, the client apparatus 2000 includes a control unit 2001, a storage unit 2002, a display unit 2003, an input unit 2004, a decoding unit 2005, and a communication unit 2006. The control unit 2001 is composed of, for example, a CPU and controls the entire client apparatus 2000.

The storage unit 2002 is mainly used as storage areas of a variety of data. For example, the storage unit 2002 is used as a storage area of programs executed by the control unit 2001 and a working area during the execution of the programs.

The display unit 2003 is composed of, for example, liquid crystal display (LCD) or an organic electroluminescence (EL) display. The display unit 2003 displays, for example, various setup screens including a delivery image setup screen, a viewer of videos received from the monitoring camera 1000, and various messages for a user of the client apparatus 2000.

The input unit 2004 is composed of, for example, buttons, arrow keys, a touch panel, and/or a mouse. The input unit 2004 notifies the control unit 2001 of the content of a user's screen operation.

The decoding unit 2005 decodes the compressed and encoded image data received via the communication unit 2006 in, for example, the JPEG format or the H.264 format and decomposes the decoded image data in the storage unit 2002.

The communication unit 2006 is used when the client apparatus 2000 transmits each control command to the monitoring camera 1000 and when the client apparatus 2000 receives a response to each control command and a video stream from the monitoring camera 1000.

Although the internal configurations of the monitoring camera 1000 and the client apparatus 2000 are described with reference to FIG. 2A and FIG. 2B, respectively, the processing blocks illustrated in FIG. 2A and FIG. 2B only describe exemplary embodiments of the monitoring camera and the client apparatus of the present invention and are not limited to the ones illustrated in FIG. 2A and FIG. 2B. It will be clear that many changes and modifications of the embodiments will be obvious to those skilled in the art without departing from the true spirit and scope of the invention. For example, an audio input unit, an audio output unit, and/or an image analysis processing unit may be provided.

The names and the content of commands and parameters used in the first embodiment will now be described.

VideoSourceConfiguration may be abbreviated to VSC and VideoEncoderConfiguration may be abbreviated to VEC in the following description.

FIG. 3 illustrates an exemplary structure of parameters held by the monitoring camera 1000 in the first embodiment.

Referring to FIG. 3, Reference 3100 denotes MediaProfile held by the monitoring camera 1000. MediaProfile 3100 is a parameter set used to store setting items necessary for video delivery of the monitoring camera 1000 in the storage unit 1002 in association with each other. MediaProfile 3100 holds ProfileToken, which is an identifier (ID) of MediaProfile 3100, and links to the various setting items including VSC and VEC. The monitoring camera 1000 may hold multiple sets of MediaProfile.

Reference 3110 denotes VideoSource. VideoSource 3110 is a collection of parameters indicating the performance of the imaging unit 1003 in the monitoring camera 1000. VideoSource 3110 includes VideoSourceToken, which is an ID of VideoSource 3110, and Resolution indicating the resolution of the image data which the imaging unit 1003 is capable of outputting.

Reference 3120 denotes VideoSourceConfiguration. VideoSourceConfiguration 3120 is a collection of parameters to associate the VideoSource 3110 of the monitoring camera 1000 with the MediaProfile 3100. Although VSC 3120 holds VideoSourceToken, which indicates an ID of the VideoSource 3110, and Bounds specifying a trimming size and a trimming position of the image output from the imaging unit 1003, VideoSourceToken and Bounds are not described in the example in FIG. 3.

Reference 3130 denotes VideoEncoderConfiguration. VideoEncoderConfiguration 3130 is a collection of parameters to associate settings in the compression encoding unit 1004, which concern the compression and encoding of the image data, with the MediaProfile 3100. VEC 3130 includes Token, which is an ID of the VEC 3130, Type specifying the compression and encoding method, and Resolution specifying the resolution of the output image. Although VEC 3130 may further include Quality specifying the quality of the compression and encoding, FramerateLimit specifying a maximum frame rate of the output image, BitrateLimit specifying a maximum bit rate, and so on, Quality, FramerateLimit, BitrateLimit, and so on are not described in the example in FIG. 3.

For example, with MediaProfile 3100 in FIG. 3, the monitoring camera 1000 compresses and encodes the image data output on the basis of the content of VideoSource 3110 and VSC 3120 in accordance with the parameters of, for example, the compression and encoding method set in VEC 3130. The monitoring camera 1000 delivers the compressed and encoded image data to the external device, such as the client apparatus 2000, via the communication unit 1005.

Reference 3140 denotes StorageConfiguration. StorageConfiguration is hereinafter abbreviated to SC. SC 3140 is a collection of parameters holding information used for accessing various storages which the monitoring camera 1000 is capable of using. SC 3140 will be described in detail below.

Reference 3150 denotes RecordingInformation. RecordingInformation 3150 is a structure that holds information about Recording resulting from abstraction of a recording file held in the imaging unit 1003 in the monitoring camera 1000. RecordingInformation 3150 holds RecordingToken identifying Recording. In other words, RecordingToken can be said to be the recording file in the imaging unit 1003.

FIG. 4A to FIG. 4E illustrate command arguments and parameters transmitted and received between the monitoring camera 1000 and the client apparatus 2000 in detail.

FIG. 4A illustrates an example of the content of SC. SC includes DeviceEntity including StorageToken, which is the ID of SC. StorageToken is information capable of uniquely identifying SC held by the monitoring camera 1000. Sc also holds a StorageConfigurationData structure that holds detailed information for accessing the storage. The StorageConfigurationData structure will be described in detail below.

FIG. 4B illustrates an example of the content of the StorageConfigurationData structure.

Referring to FIG. 4B, LocalPath holds mounting destination information when an external storage specified in SC is mounted in the monitoring camera 1000. When the monitoring camera 1000 holds the file system, LocalPath may be a path, such as "/mnt/cifs1", to the directory of the mounting destination. Alternatively, LocalPath may be a drive name or a drive symbol, such as "E", with which the mounted storage is capable of being uniquely identified. When LocalPath is capable of being identified at the monitoring camera side, this information may be omitted.

Referring to FIG. 4B, StorageUri holds the address of the external storage mounted with SC. For example, an IP address or a Uniform Resource Identifier (URI) "//cifs_server/disk1/share/" specified by a host name is used. When an SD card of the monitoring camera 1000 is to be mounted, a path, such as "/dev/sdcard/1", to a device file indicating the SD card drive is used. Other various URIs may be specified depending on an access mode type "type" described below. When the address of the external storage to be mounted is capable of being identified at the monitoring camera side, this information may be omitted.

Referring to FIG. 4B, User holds authentication information that includes a user name and a password and that is used for accessing the external storage specified by StorageUri. User will be described in detail below. When the external storage that does not need the authentication information is to be mounted, this information may be omitted.

Referring to FIG. 4B, type is information used to select the access mode type of the external storage. Information indicating the type of the external storage to be mounted with this SC, in a list of access mode types described in "StorageType" described below with reference to FIG. 4D, is held in type.

FIG. 4C illustrates an example of the content of a User-Credentials structure referred to as User in FIG. 4B.

Referring to FIG. 4C, Username holds a user name used for accessing the external storage specified by StorageUri.

Referring to FIG. 4C, Password holds a password used for accessing the external storage specified by StorageUri. When the external storage that does not need the password is to be accessed, this information may be omitted.

FIG. 4D illustrates an exemplary list of access mode types to the storage, used in type described above.

Referring to FIG. 4D, NFS denotes Network File System. NFS is defined in Request For Comment (RFC) 1094, RFC 1813, RFC 3530, or the like and is a distributed file system and its protocol normally used in UNIX (registered trademark).

Referring to FIG. 4D, SMB is a widely used file sharing service protocol.

Referring to FIG. 4D, CIFS denotes Common Internet File System. CIFS results from extension of SMB and is a standard protocol used to access a file system on a network.

Referring to FIG. 4D, CDMI denotes Cloud Data Management interface. CDMI is a standard protocol in provision of a storage cloud service.

Referring to FIG. 4D, SDCARD denotes an SD memory card. SDCARD is one type of the internal storage medium 1007 in the monitoring camera 1000 and is specified in the mounting of the internal storage medium.

Referring to FIG. 4D, AUTO is an option specified when the storage to be mounted is not specified by the client apparatus 2000. When SC having type of AUTO is specified, the monitoring camera 1000 selects an appropriate storage in accordance with a priority order or an algorithm, which is separately defined, and uses the selected storage.

FIG. 4E illustrates an example of the content of an SCOption structure.

Referring to FIG. 4E, type holds one of the access mode types described above with reference to FIG. 4D and indicates the access mode type of the storage which the monitoring camera 1000 is capable of mounting.

FIG. 5, FIG. 6, and FIG. 7 illustrate commands concerning the embodiments of the present invention and responses to the commands in detail.

FIG. 5 illustrates an example of a GetSCs command in detail. Referring to FIG. 5, (1) illustrates the content of the GetSCs command transmitted from the client apparatus 2000 to the monitoring camera 1000. (2) illustrates the content of a GetSCs response returned from the monitoring camera 1000 to the client apparatus 2000. The client apparatus 2000 is capable of acquiring the list of SCs held by the monitoring camera 1000 using the GetSCs command. In the example in FIG. 5, the monitoring camera 1000 returns four kinds of SCs 5000 to 5003.

Reference 5000 denotes SC when StorageToken=storage1, type=AUTO. When this SC is used, the monitoring camera 1000 selects the storage into and from which data is input and output.

Reference 5001 denotes SC when StorageToken=storage2, type=CIFS. When this SC is used, the monitoring camera 1000 inputs and outputs data into and from the external storage using the CIFS protocol identified by "//cifs_server/disk1/share/."

Reference 5002 denotes SC when StorageToken=storage3, type=CDMI. When this SC is used, the monitoring camera 1000 inputs and outputs data into and from the cloud service storage using the CDMI protocol identified by "//cdmi:1024/service/export."

Reference 5003 denotes SC when StorageToken=storage4, type=SDCARD. When this SC is used, the monitoring camera 1000 inputs and outputs data into and from the internal storage medium 1007, which is the SD card identified by "/dev/sdcard/1."

FIG. 6 illustrates an example of a GetSCOptions command in detail. Referring to FIG. 6, (1) illustrates the content of the GetSCOptions command transmitted from the client apparatus 2000 to the monitoring camera 1000. (2) illustrates the content of a GetSCOptions response returned from the monitoring camera 1000 to the client apparatus 2000. The client apparatus 2000 is capable of acquiring the list of access mode types supported by the monitoring camera 1000 using the GetSCOptions command. In the example in FIG. 6, the monitoring camera 1000 supports the access mode types: CIFS, CDMI, SDCARD, and AUTO.

FIG. 7 illustrates an example of a SetSC command in detail. Referring to FIG. 7, (1) illustrates the content of the SetSC command transmitted from the client apparatus 2000 to the monitoring camera 1000. (2) illustrates the content of a SetSC response returned from the monitoring camera 1000 to the client apparatus 2000. The client apparatus 2000 requests the monitoring camera 1000 to update the content of SC using the SetSC command. In the example in FIG. 7, the client apparatus 2000 requests the monitoring camera 1000 to set type of SC when StorageToken=storage1 to AUTO.

FIG. 8, FIG. 9, and FIG. 10 illustrate typical exemplary command sequences between the monitoring camera 1000 and the client apparatus 2000.

FIG. 8 illustrates a typical exemplary command sequence from connection to setting of parameters between the monitoring camera 1000 and the client apparatus 2000.

Referring to FIG. 8, Reference 6000 denotes a transaction to connect to a network device. The client apparatus 2000 unicasts or multicasts a Probe command for connection to the network device to the network. The monitoring camera 1000 connected to the network returns a ProbeMatch response, which indicates that the monitoring camera 1000 is capable of accepting the command, to the client apparatus 2000.

Reference 6001 denotes a transaction of a Subscribe command. The client apparatus 2000 instructs the monitoring camera 1000 to deliver an event using the Subscribe command.

Reference 6002 denotes a transaction of a GetServices command. The client apparatus 2000 transmits a GetServices request to the monitoring camera 1000, which has returned ProbeMatch response, in order to acquire functions supported by the monitoring camera 1000. The monitoring camera 1000 returns a GetServices response to provide a list of functions supported by the monitoring camera 1000 to the client apparatus 2000.

Reference 6003 denotes a transaction of a GetProfiles command. The client apparatus 2000 acquires the list of MediaProfiles 3100 held by the monitoring camera 1000 using the GetProfiles command.

Reference 6004 denotes a transaction of a GetVideoSources command. The client apparatus 2000 acquires the list of VideoSources 3110 held by the monitoring camera 1000 using the GetVideoSources command.

Reference 6005 denotes a transaction of a GetVSCs command. The client apparatus 2000 acquires the list of the VSCs 3120 held by the monitoring camera 1000 using the GetVSCs command.

Reference 6006 denotes a transaction of a GetVECs command. The client apparatus 2000 acquires the list of VECs 3130 held by the monitoring camera 1000 using the GetVECs command.

Reference 6007 denotes a transaction of a GetConfigurations command. The client apparatus 2000 acquires setting values concerning the imaging control unit 1006, which is held by the monitoring camera 1000, using the GetConfigurations command.

Reference 6008 denotes a transaction of a GetVECOptions command. The client apparatus 2000 acquires a setting range and options of each parameter of VEC which the monitoring camera 1000 is capable of accepting using the GetVECOptions command.

Reference 6009 denotes a transaction of a CreateProfile command. The client apparatus 2000 creates new MediaProfile in the monitoring camera 1000 to acquire ProfileToken of the created MediaProfile using CreateProfile command. After the CreateProfile command is processed, the monitoring camera 1000 transmits a MediaProfile change notification event in order to notify the client apparatus on the network that any change has been made in MediaProfile.

References 6010 and 6011 denote transactions of an AddVSC command and an AddVEC command. The client apparatus 2000 is capable of associating desired VSC and VEC with the specified MediaProfile by specifying the IDs in the AddVSC command and the AddVEC command, respectively. After the AddVSC command and the AddVEC command are processed, the monitoring camera 1000 transmits the MediaProfile change notification event in order to notify the client apparatus on the network that any change has been made in MediaProfile.

Reference 6012 denotes a transaction of a SetVEC command. The client apparatus 2000 changes each parameter of VEC on the basis of the information acquired in 6008 using the SetVEC command. After the SetVEC command is processed, the monitoring camera 1000 transmits a VEC change notification event in order to notify the client apparatus on the network that any change has been made in VEC.

FIG. 9 illustrates a typical exemplary command sequence of image delivery between the monitoring camera 1000 and the client apparatus 2000.

Referring to FIG. 9, Reference 6020 denotes a transaction of a GetStreamUri command. The client apparatus 2000 acquires an address (URI) from which the monitoring camera 1000 acquires a delivery stream on the basis of the setting of the specified MediaProfile using the GetStreamUri command.

Reference 6021 denotes a transaction of a DESCRIBE command. The client apparatus 2000 requests and acquires information about content streamed by the monitoring camera 1000 by executing the DESCRIBE command using the URI acquired in 6020.

Reference 6022 denotes a transaction of a SETUP command. The client apparatus 2000 shares the streaming method including a session number with the monitoring camera 1000 by executing the SETUP command using the URI acquired in 6020.

Reference 6023 denotes a transaction of a PLAY command. The client apparatus 2000 requests the monitoring camera 1000 to start the streaming by executing the PLAY command using the session number acquired in Step S6022.

Reference 6024 denotes a delivery stream. The monitoring camera 1000 delivers the stream the start of which is requested in 6023 with the streaming method shared in 6022.

Reference 6025 denotes a transaction of a TEARDOWN command. The client apparatus 2000 requests the monitoring camera 1000 to stop the streaming by executing the TEARDOWN command using the session number acquired in 6022.

FIG. 10 illustrates a typical exemplary command sequence concerning setting of parameters related to storages and access to the storages between the monitoring camera 1000 and the client apparatus 2000.

Referring to FIG. 10, Reference 6050 denotes a transaction of a GetServiceCapabilities command. The GetServiceCapabilities command is used to instruct the monitoring camera 1000 to return function information indicating the functions supported by the monitoring camera 1000. The function information includes information indicating whether the monitoring camera 1000 supports SC related commands. The function information may also include information indicating the maximum number of SCs which the monitoring camera 1000 is capable of holding.

Reference 6051 denotes a transaction of the GetSCs command described above with reference to FIG. 5.

Reference 6052 denotes a transaction of the GetSCOptions command described above with reference to FIG. 6.

Reference 6053 denotes a transaction of a CreateSCs command. The client apparatus 2000 requests the monitoring camera 1000 to create new SC using the CreateSCs command. The monitoring camera 1000 notifies the client apparatus 2000 of StorageToken of the created new SC in the response to the CreateSCs command.

Reference 6054 denotes a transaction of a GetSC command. The client apparatus 2000 acquires the content of the settings of specific SC held by the monitoring camera 1000 by specifying StorageToken in the GetSC command.

Reference 6055 denotes a transaction of the SetSC command described above with reference to FIG. 7. The monitoring camera 1000 mounts the storage specified in the SetSC command. The processing of the SetSC command will be described in detail below. After the SetSC command is processed, the monitoring camera 1000 transmits an SC change notification event in order to notify the client apparatus on the network that any change has been made in SC.

Reference 6056 denotes a transaction of a BackupSystem command. The client apparatus 2000 requests the monitoring camera 1000 to back up specific data in a specific storage using the BackupSystem command. The monitoring camera 1000, which has received the BackupSystem command, returns BackupToken when the monitoring camera 1000 returns a BackupSystem response to the client apparatus 2000. Then, the monitoring camera 1000 transfers backup data to the specified storage. After the backup is completed, the monitoring camera 1000 transmits a Backup completion event in order to notify the client apparatus on the network that the execution of the command is completed.

Reference 6057 denotes a transaction of a Restore command. The client apparatus 2000 requests the monitoring camera 1000 to restore specific backup data in the monitoring camera 1000 using the Restore command. With the Restore command, the client apparatus 2000 specifies BackupToken acquired in the transaction in 6056. The monitoring camera 1000, which has received the Restore command, acquires the backup data associated with BackupToken and StorageToken of the backup destination with reference to the storage unit 1002, reads out the backup data from the backup destination storage, and performs restoring. After the restoring is completed, the monitoring camera 1000 transmits a Restore completion event in order to notify the client apparatus on the network that the execution of the command is completed.

Reference 6058 denotes a transaction of an ExportVideos command. The client apparatus 2000 requests the monitoring camera 1000 to back up video data specified by the argument of the command in a specific storage using the ExportVideos command. The monitoring camera 1000, which has received the ExportVideos command, returns an ExportVideos response to the client apparatus 2000. Then, the monitoring camera 1000 transfers the video data to the specified storage. After the transfer is completed, the monitoring camera 1000 transmits an Export completion event in order to notify the client apparatus on the network that the execution of the command is completed.

Reference 6059 denotes a transaction of an Archive command. The client apparatus 2000 requests the monitoring camera 1000 to compress and store data specified by the argument of the command in a specific storage using the Archive command. The monitoring camera 1000, which has received the Archive command, returns an Archive response to the client apparatus 2000. Then, the monitoring camera 1000 compresses the specified data and transfers the compressed data to the specified storage. After the transfer is completed, the monitoring camera 1000 transmits an Archive completion event in order to notify the client apparatus on the network that the execution of the command is completed.

Reference 6060 denotes a transaction of a RemoveSC command. The monitoring camera 1000 unmounts a storage specified with the RemoveSC command. The monitoring camera 1000 unmounts the storage with reference to SC identified by StorageToken specified by the argument. For example, processing similar to that of an unmount command in the UNIX (registered trademark) system is performed. After the Remove command is processed, the monitoring camera 1000 transmits the SC change notification event in order to notify the client apparatus on the network that any change has been made in SC.

FIG. 11, FIG. 12, and FIG. 13 are flowcharts illustrating exemplary internal processes of the monitoring camera 1000.

FIG. 11 is a flowchart illustrating an exemplary process of the monitoring camera 1000 when the SetSC command has been received.

Referring to FIG. 11, in Step S7000, the control unit 1001 stores the content of SC specified by the argument of the SetSC command in the storage unit 1002 in association with StorageToken.

In Step S7001, the control unit 1001 determines Type of SC. If Type is CIFS, the process goes to Step S7002. If Type is CDMI, the process goes to Step S7003. If Type is SDCARD, the process goes to Step S7004. Type is AUTO, the process goes to Step S7006.

In Step S7002, the control unit 1001 performs CIFS mounting. Specifically, the control unit 1001 performs the mounting using the value of LocalPath included in SC as a mount point in the storage unit 1002 in the monitoring camera 1000 and using the value of StorageUri as a CIFS service address. Here, Username and Password included in SC are used as the authentication information. As a result, access to the NAS 1100, which is a CIFS server, is performed. Then, the process goes to Step S7005.

In Step S7003, the control unit 1001 performs CDMI mounting. Specifically, the control unit 1001 performs the mounting using the value of LocalPath included in SC as the mount point in the storage unit 1002 in the monitoring camera 1000 and using the value of StorageUri as the address of the cloud storage service supporting CDMI. Here, Username and Password included in SC are used as the authentication information. As a result, access to the cloud storage 1200, which is a CDMI server, is performed. Then, the process goes to Step S7005.

In Step S7004, the control unit 1001 performs SDCARD mounting. Specifically, the control unit 1001 performs the mounting using the value of LocalPath included in SC as the mount point in the storage unit 1002 in the monitoring camera 1000 and using the value of StorageUri as the device file of the SD card in the monitoring camera 1000. As a result, access to the internal storage medium 1007, that is, the SD card, is performed. Then, the process goes to Step S7005.

In Step S7005, the control unit 1001 determines whether any error has occurred in the mounting in Step S7002, S7003, or S7004. It is considered that the error has occurred when StorageUri that does not exist is specified or when a wrong password is used. If any error has occurred, the process goes to Step S7007. If no error has occurred, the process goes to Step S7006.

In Step S7006, the control unit 1001 transmits a normal response to the client apparatus 2000. Then, the process in FIG. 11 is terminated.

In Step S7007, the control unit 1001 transmits an error response to the client apparatus 2000. Then, the process in FIG. 11 is terminated.

FIG. 12 is a flowchart illustrating an exemplary process in the monitoring camera 1000 when the BackupSystem command, the ExportVideos command, or the Archive command has been received.

Referring to FIG. 12, in Step S7100, the control unit 1001 acquires Type of SC associated with StorageToken specified in the argument of the command with reference to the storage unit 1002.

In Step S7101, the control unit 1001 determines whether Type is AUTO. If Type is AUTO, the process goes to Step S7110. If Type is not AUTO, the process goes to Step S7102.

In Step S7102, the control unit 1001 acquires LocalPath included in the selected SC.

In Step S7103, the control unit 1001 performs the processing of the BackupSystem command, the ExportVideos command, or the Archive command for LocalPath acquired in Step S7102.

When the received command is the BackupSystem command, the control unit 1001 outputs certain system data in the storage unit 1002 to LocalPath acquired in Step S7102. The control unit 1001 generates BackupToken and stores the generated BackupToken in the storage unit 1002 in association with StorageToken of the transfer destination and the transfer data. BackupToken is used by the client apparatus 2000 in the Restore command described above. The monitoring camera 1000 uses BackupToken to uniquely specify the backup data to be restored. When the received command is the ExportVideos command, the control unit 1001 outputs certain video data in the storage unit 1002 to LocalPath acquired in Step S7102. When the received command is the Archive command, the control unit 1001 compresses certain data in the storage unit 1002 and outputs the compressed data to LocalPath acquired in Step S7102. As the result of Step S7103, the data is supplied to the external storage mounted in Step S7002, S7003, or S7004.

In Step S7104, the control unit 1001 performs a response transmission step. The control unit 1001 transmits the normal response to the client apparatus 2000 via the communication unit 1005 in Step S7104. When the received command is an ExportSystem command, the control unit 1001 transmits the normal response to the client apparatus 2000 along with BackupToken generated in Step S7103. Then, the process in FIG. 12 is terminated.

In Step S7110, the control unit 1001 performs a storage selection step. The storage selection step is described in detail below.

In Step S7111, the control unit 1001 determines whether any error has occurred in the storage selection step. If any error has occurred, the process goes to Step S7112. If no error has occurred, the control unit 1001 uses SC output in the storage selection step as SC input in the processing of the corresponding command. In this case, the process goes to Step S7102.

In Step S7112, the control unit 1001 performs an error response transmission step. The control unit 1001 transmits the error response to the client apparatus 2000 via the communication unit 1005 in Step S7112. Then, the process in FIG. 12 is terminated.

FIG. 13 is a flowchart illustrating an exemplary behavior of the control unit 1001 in the storage selection step in the process in FIG. 12.

Referring to FIG. 13, in Step S7200, the control unit 1001 determines whether any mounted storage exits with reference to the storage unit 1002. If no mounted storage exits, the process goes to Step S7210. If any mounted storage exists, the process goes to Step S7201.

In Step S7201, the control unit 1001 acquires information about the mounted storages with reference to the storage unit 1002. Then, the control unit 1001 selects the storage having the highest priority, among the mounted storages, on the basis of a predetermined access mode type priority order. The access mode type priority order will be described in detail below.

In Step S7202, the control unit 1001 outputs StorageToken of the storage selected in Step S7201. Then, the storage selection step is terminated.

In Step S7210, the control unit 1001 outputs an error. Then, the storage selection step is terminated.

The access mode type priority order is capable of being implemented in various modes.

FIG. 14A and FIG. 14B are tables illustrating exemplary information concerning the access mode type priority order.

FIG. 14A illustrates an example of the access mode type priority order. In the example in FIG. 14A, the priority order is determined on the basis of StorageType for each received command. For example, when the received command is the BackupSystem command, in Step S7201, the mounted storages are selected on the basis of the priority order of StorageType: the storage having StorageType of SDCARD is first selected, the storage having StorageType of CDMI is next selected, and the storage having StorageType of CIFS is finally selected.

FIG. 14B illustrates another example of the access mode type priority order. In the example in FIG. 14B, the priority order is determined on the basis of StorageToken for each received command. For example, when the received command is the ExportVideos command, in Step S7201, the mounted storages are selected on the basis of the priority order of StorageToken: the storage having StorageToken of Storage2 is first selected, the storage having StorageToken of Storage3 is next selected, and the storage having StorageToken of Storage1 is finally selected.

As another example of the access mode type priority order, priority may be given to the internal storage media 1007, such as the SD card or the USB drive, or to the external storages including the NAS 1100 and the cloud storage 1200 for each received command.

The access mode type priority order described above may be held in the storage unit 1002 in the monitoring camera 1000 in advance. Alternatively, a command to set the access mode type priority order may be supported and the access mode type priority order may be set by the client apparatus 2000 using the command.

Alternatively, the access mode type priority order may be dynamically determined on the basis of the free space of each storage. In Step S7201, for example, the control unit 1001 may acquire the free space of each mounted storage by executing a command corresponding to df in a Linux (registered trademark) system and higher priority may be given to the storages having larger free spaces. This allows control in which the free space of each storage is ensured as much as possible.

FIG. 15 illustrates an exemplary Storage Operation screen. The Storage Operation screen is a user interface in the client apparatus 2000, which is used to change the settings of the storages in the monitoring camera 1000 and operate access to the storages.

FIG. 16, FIG. 17, FIG. 18, and FIG. 19 are flowcharts illustrating an exemplary behavior of the client apparatus 2000 concerning the Storage Operation screen.

Referring to FIG. 15, Reference 8000 denotes an Operation selection dropdown list used to select an operation concerning the storage. A list of storage operation commands supported by the monitoring camera 1000 is displayed in the Operation selection dropdown list 8000 in accordance with the result of the transaction 6050 of the GetServiceCapabilities command. The storage operation commands are commands typified by BackupSystem, Restore, ExportVideos, and Archive. Mount and Unmount commands are displayed in the Operation selection dropdown list 8000, in addition to the storage operation commands. With the Mount command, the transaction 6055 of the SetSC command to mount the selected storage is performed. With the Unmount command, the transaction 6060 of the RemoveSC command to unmount the selected storage is performed.

Reference 8001 denotes an Operation Target ID selection dropdown list. A list of IDs of the storages for which the command selected in the Operation selection dropdown list 8000 is to be executed is displayed in the Operation Target ID selection dropdown list 8001. The command selected in the Operation selection dropdown list 8000 is executed for the ID selected in the Operation Target ID selection dropdown list 8001.

Reference 8002 denotes a Storage type selection-display area. Reference 8003 denotes a Local Path specification-display area. Reference 8004 denotes a Storage Uri specification-display area. Reference 8005 denotes a Username specification-display area. Reference 8006 denotes a Password specification-display area. When StorageToken is selected in the Operation Target ID selection dropdown list 8001, the content of the settings of SC identified by the selected StorageToken is displayed in the storage type selection-display area 8002 to the Password specification-display area 8006. When "New" is selected in the Operation Target ID selection dropdown list 8001, a new storage is mounted using information input by the user in the storage type selection-display area 8002 to the Password specification-display area 8006 before the storage operation command specified in the Operation selection dropdown list 8000 is executed.

Reference 8007 denotes a Target Data selection area into which data to be transferred to the storage with the storage operation command is input.

Reference 8008 denotes an Invoke button. The command selected in the Operation selection dropdown list 8000 is executed upon depression of the Invoke button 8008.

Reference 8009 denotes a Cancel button. The Storage Operation screen is closed upon depression of the Cancel button 8009.

FIG. 16, FIG. 17, FIG. 18, and FIG. 19 are flowcharts illustrating an exemplary process concerning the Storage Operation screen, performed by the control unit 2001.

Referring to FIG. 16, in Step S9000, the control unit 2001 causes the display unit 2003 to display the entire Storage Operation screen described above with reference to FIG. 15.

In Step S9001, the control unit 2001 performs the transaction 6050 to display the commands supported by the target monitoring camera 1000 in the Operation selection dropdown list 8000.

In Step S9002, the control unit 2001 performs the transaction 6052 to display StorageTypes supported by the target monitoring camera 1000 in the storage type selection-display area 8002.

In Step S9003, the control unit 2001 causes the display unit 2003 to display the LocalPath specification-display area 8003, the StorageUri specification-display area 8004, the Username specification-display area 8005, and the Password specification-display area 8006. In addition, the control unit 2001 causes the display unit 2003 to display the target data selection area 8007, the invoke button 8008, and the Cancel button 8009.

In Step S9004, the control unit 2001 performs the transaction 6051 to display the StorageToken list acquired from the monitoring camera 1000 and the "new" option in the Operation Target ID selection dropdown list 8001.

In Step S9005, the control unit 2001 waits for a user's operation event from the input unit 2004 and an event reception event from the decoding unit 2005. If an option other than the Restore command is selected in the Operation selection dropdown list 8000, the process goes back to Step S9004. If the Restore command is selected in the Operation selection dropdown list 8000, the process goes to Step S9006. If any StorageToken is selected in the Operation Target ID selection dropdown list 8001, the process goes to Step S9010. If the Invoke button 8008 is depressed in a state in which the BackupSystem command, the ExportVideos command, or the Archive command is selected in the Operation selection dropdown list 8000, the process goes to Step S9020. If the Invoke button 8008 is depressed in a state in which the Mount command is selected in the Operation selection dropdown list 8000, the process goes to Step S9030. If the Invoke button 8008 is depressed in a state in which the Unmount command is selected in the Operation selection dropdown list 8000, the process goes to Step S9040.

In Step S9006, the control unit 2001 acquires BackupToken acquired in the execution of the transaction 6056 from the storage unit 2002 and displays the acquired BackupToken in the Operation Target selection dropdown list 8001. Then, the process goes back to Step S9004.

In Step S9010, the control unit 2001 displays the content of SC acquired in the execution of the transaction 6054 in the storage type selection-display area 8002 to the target data selection area 8007. Then, the process goes back to Step S9004.

Referring to FIG. 17, in Step S9020, the control unit 2001 determines whether "New" is selected in the Operation Target ID selection dropdown list 8001. If "New" is selected in the Operation Target ID selection dropdown list 8001, the process goes to Step S9021. If an option other than "New" is selected in the Operation Target ID selection dropdown list 8001, the process goes to Step S9022.

In Step S9021, the control unit 2001 performs the transaction 6053 to create new SC and acquires StorageToken. Then, the process goes to Step S9023.

In Step S9022, the control unit 2001 acquires StorageToken selected in the Operation Target ID selection dropdown list 8001. Then, the process goes to Step S9024.

In Step S9023, the control unit 2001 performs the transaction 6055 using StorageToken acquired in Step S9021 and the information input by the user in the storage type selection-display area 8002 to the Password specification-display area 8006. When AUTO is selected in the storage type selection-display area 8002, the information in the LocalPath specification-display area 8003 to the Password specification-display area 8006 is not used.

In Step S9024, the control unit 2001 performs the transaction 6056, 6058, or 6059 in accordance with the content selected in the Operation selection dropdown list 8000 for StorageToken acquired in Step S9021 or Step S9022.

In Step S9025, the control unit 2001 stores BackupToken returned from the monitoring camera 1000 in the storage unit 2002 when the transaction 6056 has been performed in Step S9024.

In Step S9026, the control unit 2001 waits for reception of an execution completion event of each command. If the execution completion event of the command has been received, the process goes back to Step S9004.

Referring to FIG. 18, in Step S9030, the control unit 2001 determines whether "New" is selected in the Operation Target ID selection dropdown list 8001. If "New" is selected in the Operation Target ID selection dropdown list 8001, the process goes to Step S9031. If an option other than "New" is selected in the Operation Target ID selection dropdown list 8001, the process goes back to Step S9004.

In Step S9031, the control unit 2001 performs the transaction 6053 to create new SC and acquires StorageToken.

In Step S9032, the control unit 2001 performs the transaction 6055 for StorageToken acquired in Step S9031.

In Step S9033, the control unit 2001 waits for reception of the execution completion event of each command. If the execution completion event of the command has been received, the process goes back to Step S9004.

Referring to FIG. 19, in Step S9040, the control unit 2001 determines whether "New" is selected in the Operation Target ID selection dropdown list 8001. If "New" is selected in the Operation Target ID selection dropdown list 8001, the process goes to Step S9041. If an option other than "New"

is selected in the Operation Target ID selection dropdown list 8001, the process goes back to Step S9004.

In Step S9041, the control unit 2001 performs the transaction 6060 for StorageToken selected in the Operation Target ID selection dropdown list 8001.

In Step S9042, the control unit 2001 waits for reception of the execution completion event of each command. If the execution completion event of the command has been received, the process goes back to Step S9004.

As described above, according to the first embodiment, the imaging apparatus capable of transmitting and receiving data to and from multiple storages mounted on a network is provided. The imaging apparatus includes a first interface that receives detailed information necessary for mounting the storages and an instruction to mount a specific storage and a second interface that receives an instruction to mount an arbitrary storage with at least part of the detailed information used for mounting the storages being omitted.

In addition, according to the first embodiment, when the client apparatus causes the imaging apparatus to mount an external network storage, the user of the imaging apparatus may not necessarily input a variety of information concerning the mounting. It is possible for a user other than the manager to easily use the external storage.

Second Embodiment

The monitoring camera that provides AUTO as an option of the storage type is exemplified in the first embodiment.

If the storage having type of AUTO is specified with the detailed information about the storage being omitted, the monitoring camera 1000 of the first embodiment determines whether any mounted storage exists and, if no mounted storage exists, outputs an error. In other words, it is necessary for any external storage to be mounted in advance as a precondition of the use of type of AUTO. However, any external storage may not be mounted in advance.

If no mounted storage exists, any storage may be automatically mounted in the storage selection step to make the storage available without using the precondition in the first embodiment.

A file in the storage unit 1002 in the monitoring camera 1000 may be used as a storage, instead of the external storage.

A second embodiment of the present invention will now be described in consideration of the above points. A detailed description of portions common to the first embodiment is omitted herein.

FIG. 1 illustrates an exemplary configuration of an imaging system including the monitoring camera 1000, which is an imaging apparatus, and the client apparatus 2000 in the second embodiment of the present invention.

FIG. 2A and FIG. 2B are block diagrams illustrating exemplary internal configurations of the monitoring camera 1000 and the client apparatus 2000, respectively.

FIG. 3 illustrates an exemplary structure of parameters held by the monitoring camera 1000 in the second embodiment.

FIG. 4A to FIG. 4E illustrate command arguments and parameters transmitted and received between the monitoring camera 1000 and the client apparatus 2000 in detail.

FIG. 5, FIG. 6, and FIG. 7 illustrate commands concerning the embodiments of the present invention and responses to the commands in detail.

FIG. 8, FIG. 9, and FIG. 10 illustrate typical exemplary command sequences between the monitoring camera 1000 and the client apparatus 2000.

FIG. 11, FIG. 12, and FIG. 13 are flowcharts illustrating exemplary internal processes of the monitoring camera 1000.

FIG. 14A and FIG. 14B are tables illustrating exemplary information concerning the access mode type priority order.

FIG. 15 illustrates a user interface in the client apparatus 2000, which is used to change the settings of the storages in the monitoring camera 1000 and operate access to the storages.

FIG. 16, FIG. 17, FIG. 18, and FIG. 19 are flowcharts illustrating an exemplary process concerning the Storage Operation screen, performed by the control unit 2001.

FIG. 13 is a flowchart illustrating an exemplary behavior of the control unit 1001 in the storage selection step in the process in FIG. 12.

In Step S7200 in FIG. 13, the control unit 1001 determines whether any mounted storage exits with reference to the storage unit 1002. If no mounted storage exits, the control unit 1001 acquires RecordingInformation 3150 with reference to the storage unit 1002. The control unit 1001 outputs RecordingToken included in the acquired RecordingInformation as the storage selected in the storage selection step.

In Step S7102 in FIG. 12, if the selected storage is Recording, the control unit 1001 acquires a file path in the storage unit 1002 abstracted with Recording.

In Step S7103, the control unit 1001 performs the processing of the BackupSystem command, the ExportVideos command, or the Archive command for the file path acquired in Step S7102. As a result, the storage operation command is executed for the file stored in the storage unit 1002, that is, Recording.

Also in the client apparatus 2000, RecordingToken may be set as the target of the storage operation command.

In Step S9004 in FIG. 16, the control unit 2001 performs the transaction 6051 to display the StorageToken list acquired from the monitoring camera 1000. In addition, the control unit 2001 executes a GetRecordings command to acquire a Recording list held by the target monitoring camera 1000. The control unit 2001 displays the acquired StorageToken, the acquired RecordingToken, and the "new" option in the Operation Target ID selection dropdown list 8001.

According to the second embodiment described above, the user of the imaging apparatus may not necessarily input a variety of information concerning the mounting even when the client apparatus causes the imaging apparatus to mount an external network storage in a situation in which the external storage is not mounted in the imaging apparatus. It is possible for a user other than the manager to easily use the external storage.

In addition, using a file, that is, Recording existing in the storage unit in the imaging apparatus as the target of the storage operation command allows the storage operation command to be easily used even in a situation in which access to all external storages is disabled.

The embodiments of the present invention are realized by performing the following process. Specifically, software (program) realizing the functions in the above embodiments is supplied to a system or an apparatus via a network or various storage media and a computer (or a CPU or a micro processing unit (MPU)) in the system or the apparatus reads out the program and executes the program.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

For example, the following modifications may be made:

1) Although the mounting is not performed if Type is AUTO in the process when the SetSC command has been received in FIG. 11, the process in FIG. 11 is not limited to this. If no storage is mounted, an accessible storage set in advance may be automatically mounted at this time and the storage may be used in SC.

2) Although typical six types of StorageType are listed in FIG. 4D, the types of StorageType are not limited to the ones illustrated in FIG. 4D. The types of StorageType may include, for example, File Transfer Protocol (FTP). The types of StorageType may include various mountable storage types including a USB drive and a Blu-ray disc recordable drive (BD-R drive) as the internal storage media.

3) The video data to be exported may be specified by the client apparatus 2000 in the transaction 6058 of the ExportVideos command with various methods. For example, ProfileToken identifying MediaProfile 3100 held by the monitoring camera 1000 may be specified and the video data to be streamed in accordance with the content of the setting of MediaProfile may be specified as the export target. Alternatively, the recording file that is identified by RecordingToken in RecordingInformation 3150 and that is held by the monitoring camera 1000 may be specified as the export target.

4) Although the monitoring camera 1000 compresses the data in the transaction 6059 of the Archive command, the data may be compressed at the storage side.

As described above, according to the embodiments of the present invention, the user of the imaging apparatus may not necessarily input a variety of information concerning the mounting when the client apparatus causes the imaging apparatus to mount an external network storage. It is possible for a user other than the manager to easily use the external network storage.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present ion has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-054184, filed Mar. 17, 2014, which is hereby incorporated by reference herein in its entirety.

The invention claimed is:

1. An imaging apparatus capable of transmitting and receiving data to and from a plurality of storages mounted on a network, the imaging apparatus comprising:
   an imaging unit configured to capture an image;
   a memory configured to store a priority order of the plurality of storages;
   one or more interfaces configured to receive a first command or a second command, and a third command, wherein the first command includes an instruction to mount a specific storage, wherein the second command includes an instruction to mount a storage selected by the imaging apparatus from among the plurality of storages, and wherein the third command includes an instruction to execute one of a plurality of types of data transfer processing by using a mounted storage; and
   one or more processors configured to automatically select and mount a storage from among the plurality of storages, the plurality of storages not mounted to the imaging apparatus, if the one or more interfaces receive the second command and the third command, the storage to mount being selected based on the type of data transfer processing specified in the instruction included in the third command in a case where no storage has been mounted to the imaging apparatus.

2. The imaging apparatus according to claim 1,
   wherein the third command further includes an instruction to start a processing of the type of data transfer processing for which the third command includes an instruction,
   wherein the data transfer processing is related to transmission or reception of data, and
   wherein the memory stores a plurality of priority orders of storages, each priority order corresponding to a respective type of the plurality of types of data transfer processing.

3. The imaging apparatus according to claim 1, wherein the memory further stores detailed information necessary for mounting the respective plurality of storages related to the priority orders.

4. The imaging apparatus according to claim 3, wherein, if no mounted storage exists that corresponds to the storage selected based on the priority order, in response to the instruction included in the second command, the one or more processors are configured to mount a predetermined storage and data is transmitted to and received from the mounted predetermined storage.

5. The imaging apparatus according to claim 4, wherein the predetermined storage is a file stored in the imaging apparatus.

6. The imaging apparatus according to claim 1, wherein the first command specifies a file stored in the imaging apparatus as a mount target.

7. The imaging apparatus according to claim 1, wherein the plurality of types of data transfer processing indicated by the third command includes at least one of BackupSystem, ExportVideos, and Archive.

8. A method of controlling an imaging apparatus capable of transmitting and receiving data to and from a plurality of storages mounted on a network and storing a priority order of the plurality of storages in a memory, the method comprising:

capturing an image;
receiving a first command or a second command, and a third command, wherein the first command includes an instruction to mount a specific storage, and wherein the second command includes an instruction to mount a storage selected by the imaging apparatus from among the plurality of storages, and wherein the third command includes an instruction to execute one of a plurality of types of data transfer processing by using a mounted storage; and
automatically selecting and mounting a storage from among the plurality of storages, the plurality of storages not mounted to the imaging apparatus, if the second command and the third command are received in the receiving, the storage to mount being selected based on the type of data transfer processing specified in the instruction included in the third command in a case where no storage has been mounted to the imaging apparatus.

* * * * *